(12) United States Patent
Sakamoto et al.

(10) Patent No.: US 7,907,083 B2
(45) Date of Patent: Mar. 15, 2011

(54) RADAR DEVICE

(75) Inventors: Mai Sakamoto, Konan (JP); Kazuma Natsume, Oobu (JP); Yuu Watanabe, Toyota (JP); Hideki Shirai, Koganei (JP); Chiharu Yamano, Tokyo (JP)

(73) Assignee: Denso Corporation, Kariya (JP)

( * ) Notice: Subject to any disclaimer, the term of this patent is extended or adjusted under 35 U.S.C. 154(b) by 44 days.

(21) Appl. No.: 12/584,982

(22) Filed: Sep. 15, 2009

(65) Prior Publication Data
US 2010/0073216 A1  Mar. 25, 2010

(30) Foreign Application Priority Data

Sep. 22, 2008 (JP) ................................. 2008-243145

(51) Int. Cl.
  *G01S 13/42* (2006.01)
(52) U.S. Cl. .......... 342/70; 342/108; 342/147; 342/189; 342/192; 342/195
(58) Field of Classification Search .............. 342/70–72, 342/90, 107–108, 115, 133, 139, 145–147, 342/189, 192, 195–196
See application file for complete search history.

(56) References Cited

U.S. PATENT DOCUMENTS

| | | | | |
|---|---|---|---|---|
| 5,068,597 | A * | 11/1991 | Silverstein et al. | 324/76.19 |
| 6,822,606 | B2 * | 11/2004 | Ponsford et al. | 342/192 |
| 7,486,230 | B2 * | 2/2009 | Takano et al. | 342/189 |
| 7,567,201 | B2 * | 7/2009 | Miyake | 342/70 |
| 7,782,249 | B2 * | 8/2010 | Shirakawa | 342/147 |
| 7,847,733 | B2 * | 12/2010 | Shirakawa | 342/417 |
| 2004/0189523 | A1 * | 9/2004 | Kishigami et al. | 342/417 |
| 2006/0224655 | A1 * | 10/2006 | Shirai et al. | 708/607 |
| 2007/0024492 | A1 | 2/2007 | Takano et al. | |

(Continued)

FOREIGN PATENT DOCUMENTS

DE  102006036099  *  2/2007

(Continued)

OTHER PUBLICATIONS

"Angular superresolution for phased antenna array by phase weighting", IEEE Transactions on Aerospace and Electronic Systems, Oct. 2001, vol. 37, No. 4, p. 1450-814, Wei-Xing-Sheng, Da-Gang-Fang.*

*Primary Examiner* — John B Sotomayor
(74) *Attorney, Agent, or Firm* — Harness, Dickey & Pierce, PLC

(57) ABSTRACT

A FMCW-type radar device generates snapshot data from a beat signal that represents a received condition of the radar device every modulation period. Auto-correlation matrices generated by the snapshot data every modulation period are averaged every set of plural periods. The radar device calculates the target azimuth of a target object such as a preceding vehicle based on the averaged auto-correlation matrix based on MUSIC (MUltiple SIgnal Classification) method. This averaging is performed by weighting average based on an amount of mixed noise (or an interference amount) contained in the snapshot data in each modulation period. A weighting coefficient to be applied to the auto-correlation matrix in each modulation period is set to a value corresponding to the amount of mixed noise, namely, the interference amount of this modulation period. The weighting coefficient becomes large when the interference amount is small, and on the other hand, becomes small when it is large.

28 Claims, 12 Drawing Sheets

U.S. PATENT DOCUMENTS

| | | | |
|---|---|---|---|
| 2008/0122681 A1* | 5/2008 | Shirakawa | 342/147 |
| 2008/0231496 A1* | 9/2008 | Sakamoto | 342/59 |
| 2009/0309784 A1* | 12/2009 | Natsume | 342/189 |
| 2010/0045507 A1* | 2/2010 | Yamano et al. | 342/70 |
| 2010/0073216 A1* | 3/2010 | Sakamoto et al. | 342/70 |

FOREIGN PATENT DOCUMENTS

| | | |
|---|---|---|
| JP | 2006-284182 | 10/2006 |
| JP | 2006-300720 | 11/2006 |

* cited by examiner

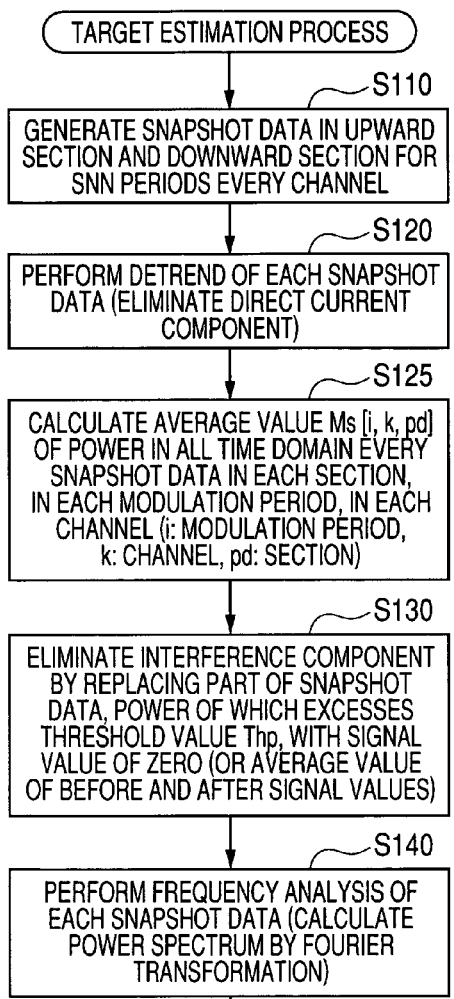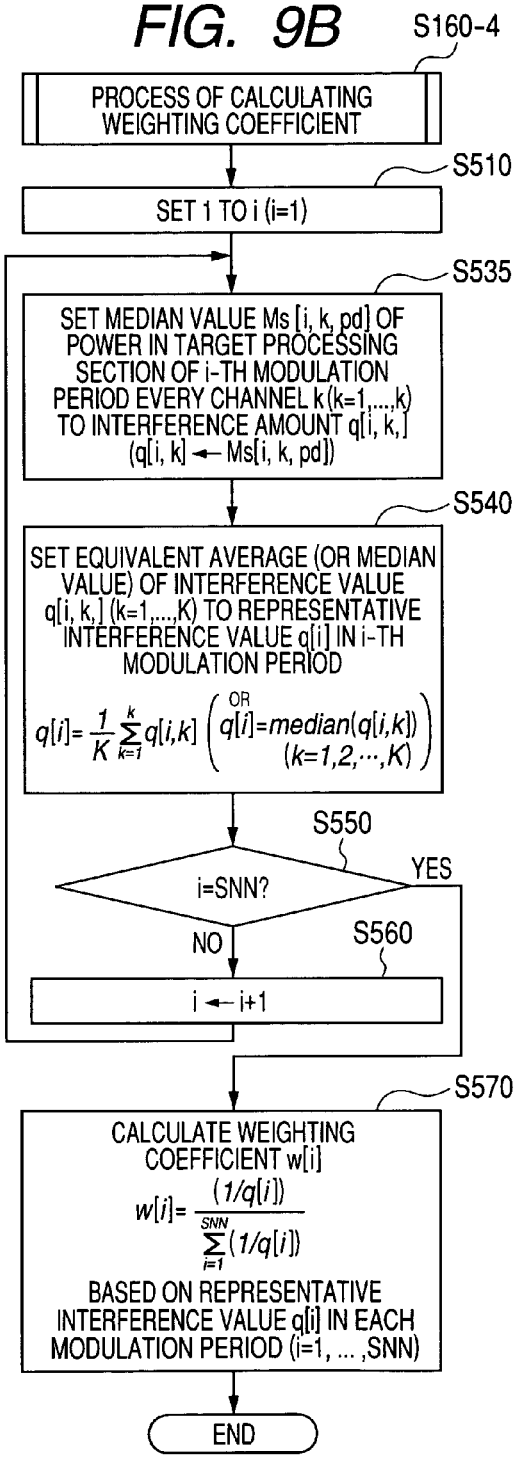

FIG. 10
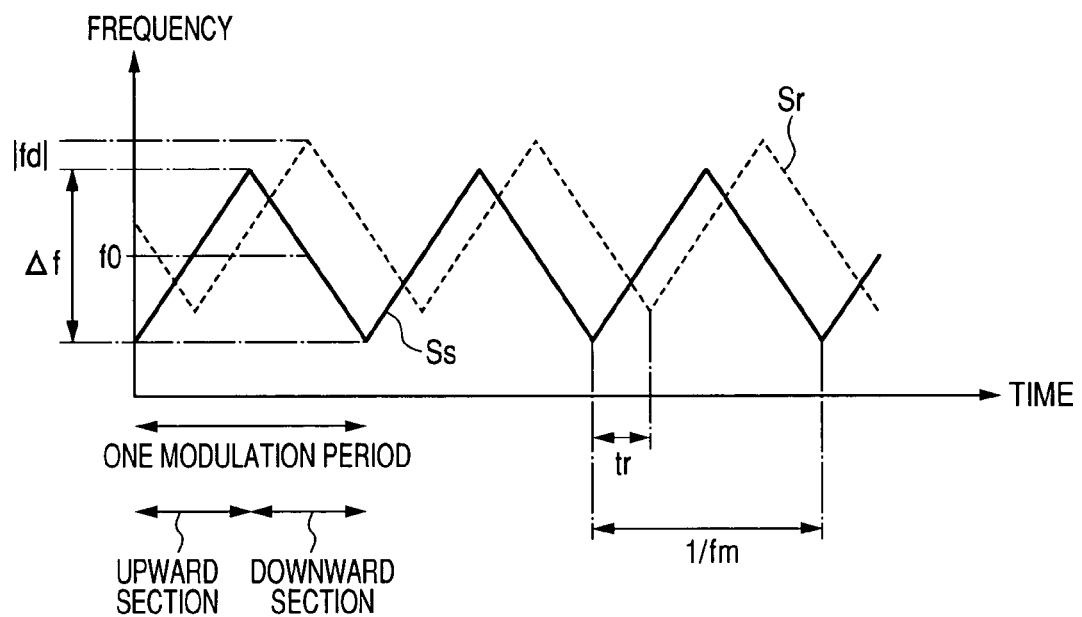
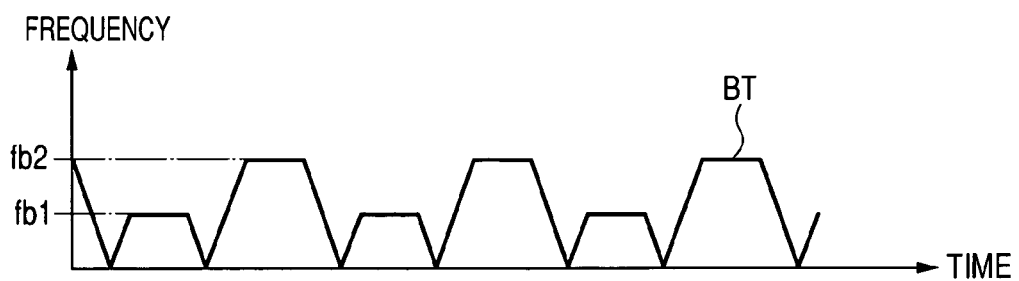

ND DEVICE

CROSS-REFERENCE TO RELATED APPLICATION

This application is related to and claims priority from Japanese Patent Application No. 2008-243145 filed on Sep. 22, 2008, the contents of which are hereby incorporated by reference.

BACKGROUND OF THE INVENTION

1. Field of the Invention

The present invention relates to a radar device capable of transmitting a radar wave and receiving a reflected radar wave (as an arrival wave), and obtaining target information regarding a target position, a traveling (moving) speed, and a target azimuth (or the direction) of the target object based on received signals, corresponding to the reflected radar wave, obtained through an array antenna.

2. Description of the Related Art

There are various types of known conventional radar devices, for example, one of which is mounted to one's own vehicle (hereinafter, referred to as the "driver's vehicle"), and generates and transmits a transmission radar wave as an observation signal toward the forward direction of the driver's vehicle. The on-vehicle radar device receives a reflected radar wave (or an arrival wave) reflected by a target object such as a preceding vehicle. This preceding vehicle is present or traveling in front of the driver's vehicle. The on-vehicle radar device calculates a target distance, a target azimuth (or a target angle), and a relative traveling speed of the target object based on the reflected radar wave. That is, the target distance of the target object as a preceding vehicle is a distance between the driver's vehicle and the target object which is present in front of the driver's vehicle. The target azimuth is an azimuth of the target object observed from the position of the driver's vehicle. The relative speed is a traveling speed of the target object in consideration with the traveling speed of the driver's vehicle.

There is a FMCW (Frequency Modulated Continuous Wave) radar device as an on-vehicle radar device. For example, there are related-art documents showing such a FMCW radar device, for example, Japanese patent laid open publication No. JP 2006-284182 and No. JP 2006-300720 have disclosed such a FMCW radar device.

As shown by the solid line at the upper part in FIG. 10, the FMCW radar device transmits a radar wave as a transmission signal (or a sending signal) Ss, and then receives a reflected radar wave (or an arrival wave) reflected by the target object such as a preceding vehicle, as shown in FIG. 11A. The transmission signal Ss is obtained by frequency-modulation using an modulation signal on a triangle wave so that the frequency of the transmission signal Ss is linearly and gradually increased, and decreased in the course of time (see the upper side in FIG. 10).

At this time, as designated by the dotted line at the upper side of FIG. 10, the received signal Sr corresponding to the reflected radar wave and received through the array antenna is delayed in time from the transmission signal Ss by the time tr. This time tr corresponds to the time required for the radar wave to travel between the target object and the driver's vehicle, namely, corresponds to the distance between the target object and the driver's vehicle. The received signal Sr is doppler-shifted by the frequency fd toward the frequency-down direction corresponding to the relative speed between the target object and the driver's vehicle.

The FMCW radar device mixes the received signal Sr with the transmission signal Ss to produce a beat signal BT (see the bottom side in FIG. 10). The FMCW radar device calculates a target distance D and a relative speed V between the driver's vehicle and the target object based on a frequency fb1 and a frequency fb2 of the beat signal BT according to the following equations (1) to (4). The frequency fb1 of the beat signal BT is a frequency during a upward section (or a rising section) in which the frequency of the transmission signal Ss is increased, and the frequency fb2 of the beat signal BT is a frequency during a downward section (or a falling section) in which the frequency of the transmission signal Ss is decreased.

$$D = \frac{c \cdot fr}{4 \cdot fm \cdot \Delta f}, \qquad (1)$$

$$V = \frac{c \cdot fd}{2 \cdot f0}, \qquad (2)$$

$$fd = \frac{fb1 - fb2}{2}, \qquad (3)$$

and $$fr = \frac{fb1 + fb2}{2}, \qquad (4)$$

where "c" designates a propagation speed of a transmission signal Ss such as a radar (or radio) wave, "fm" denotes a modulated frequency of the transmission signal Ss, "$\Delta f$" denotes a width in fluctuation of the transmission signal Ss, and "f0" designates a central frequency of the transmission signal Ss.

That is, the FMCW radar device performs Fourier transformation of the beat signal BT, and then performs Frequency analysis in order to specify the frequency fb1 of the reflected wave component of the beat signal BT in the upward section, and the frequency fb2 of the reflected wave component of the beat signal BT in the downward section.

The FMCW radar device then obtains the target distance D to the target object which is present or traveling in the front area of the driver's vehicle, and the relative speed V between the target object and the driver's vehicle based on the calculated frequencies fb1 and fb2.

The FMCW radar device calculates the azimuth of the target object observed from the driver's vehicle based on the reflected radar wave received by each of antenna elements in the array antenna as a receiving antenna, where the reflected wave has a phase difference corresponding to its arrival direction or coming direction. There has been known a method of obtaining the direction of the target using the array antenna composed of a plurality of antenna elements. In the method, an auto-correlation matrix of the received signal obtained through each of the antenna elements is firstly generated, an angle spectrum is generated based on the auto-correlation matrix, and the angle spectrum is analyzed in order to obtain the azimuth of the target. For example, there have been known MUSIC (MUltiple SIgnal Classification) method, DBF (Digital Beam Forming) method, and CAPON method as the direction calculation method to calculate the azimuth of the target.

A description will now be given of the explanation of the MUSIC method which is one of well-known methods to calculate the arrival direction (or coming direction) of a reflected wave. In the following explanation, the array antenna is a linear antenna composed of "k" antenna elements which is arranged in line at constant interval, where "k" is an integer. This type of the array antenna will be referred to as the "linear array antenna".

At first, Fourier transformation is performed for a beat signal BT, which corresponds to each of the antenna elements that forms the array antenna. A received vector X expressed by the following equation (5) is obtained by arranging Fourier transformed values at the peak frequency of each of the beat signals BT corresponding to the antenna elements of the array antenna. Next, an auto-correlation matrix Rxx with k rows and k columns expressed by the following equation (6) is obtained using the received vector X.

$$X = [x_1, x_2, \ldots, x_K]^T \quad (5), \text{ and}$$

$$Rxx = XX^H \quad (6)$$

where, an element $x_k$ (k=1, ..., and K) of the received vector X corresponds to the Fourier transformed value (as complex numbers) of k-th antenna element at the peak frequency which is commonly appeared in each of the K antenna elements. The value T in the above equation (5) designates a vector transpose, and the value H designates a complex conjugate transpose.

Because the peak frequency indicates the frequency of the reflected radar wave in the ideal condition where the receive signal received by each of the antenna elements does not contain any noise, the peak frequency is one of the above frequencies fb1 and fb2.

In general, the received vector X expressed by the equation (5) is obtained by performing Fourier transformation of the best signals BT in each of an upward section and a downward section, obtaining the peak frequency every the upward section and the downward section, and then arranging the Fourier transformed value of each of the antenna elements at the pear frequency.

Next, the azimuth of the target object, at which the transmission wave as the radar wave is reflected, is calculated by the following procedure using the auto-correlation matrix of the received vector X which is generated every the upward section and the downward section.

Specifically, eigenvalues $\lambda_1, \ldots,$ and $\lambda_K$ (where, $\lambda_1, \geq \lambda_2, \geq \ldots \lambda_K$) of the auto-correlation matrix Rxx are obtained. The number M of arrival waves is estimated based on the number of the eigenvalues $\lambda_K$ which are greater than a threshold value $\lambda_{th}$ corresponding to a thermal noise (Johnson-Nyquist noise) power. Further, the eigenvalue vectors $e_{M+1}, \ldots,$ and $e_K$ corresponding to (K-M) eigenvalues $\lambda_{M+1}, \ldots, \lambda_K$ which are not more than the thermal noise power are calculated.

The MUSIC spectrum expressed by the following evaluation function $P_{MU}(\theta)$ expressed by the following equation (8) as the angle spectrum is then obtained from a noise eigenvalue vector $E_N$ expressed by the following equation (7), and a complex response to a target azimuth θ, namely, a steering vector a(θ), where the noise eigenvalue vector $E_N$ is composed of the eigenvalue vectors $e_{M+1}, \ldots,$ and $e_k$ corresponds to (K-M) eigenvalues $\lambda_{M+1}, \ldots,$ and $\lambda_K$ is not more than the thermal noise power.

$$E_N = (e_{M+1}, e_{M+2}, \ldots, e_K), \quad (7)$$
and $$P_{MU}(\theta) = \frac{a^H(\theta) a(\theta)}{a^H(\theta) E_N E_N^H a(\theta)}. \quad (8)$$

As shown in FIG. 11B, because the MUSIC spectrum expressed by the evaluation function $P_{MU}(\theta)$ expressed by the equation (8) has a sharp spectrum when the azimuth θ is coincided with the arrival direction of the arrival wave, the azimuth $\theta_1, \ldots, \theta_M$ of the arrival wave, namely the azimuth of the target, by which the transmission wave is reflected, can be obtained by extracting the peak (null point) of the MUSIC spectrum.

That is, the conventional radar device obtains the peak frequency based on the power spectrum of the beat signal BT every section such as the upward section and the downward section, and the azimuth $\theta_1, \ldots, \theta_M$ of the arrival wave (as the reflected radar wave) of the peak frequency is obtained from the peak of the MUSIC spectrum in order to obtain the azimuth θ of the arrival wave from the target object (or the reflected wave reflected by the target).

It is necessary to obtain the azimuth of the target object every section such as the upward section and the downward section because a plurality of perk frequencies are detected in the power spectrum of the beat signal BT in each of the upward section and the downward section when a plurality of preceding vehicles are present or traveling in front of the driver's vehicle, and the array antennal mounted onto the driver's vehicle receives a plurality of the reflected radar waves as arrival waves reflected by those preceding vehicles.

Presence of a plurality of peak frequencies in each section makes it difficult to accurately determine which combination of peak frequencies indicates the combination of the frequencies fb1 and fb2. In order to solve this difficulty, the conventional radar device obtains the azimuth θ of each of the peak frequencies in each section such as the upward section and the downward section, and then specifies the peak frequency in the upward section and the peak frequency in the downward section having the same azimuth θ thereof as the combination of the frequencies fb1 and fb2. The conventional radar device obtains the target distance D of the target object, the relative speed between the target object and the driver's vehicle, and the target azimuth θ of the target object based on the combination of the specified peak frequencies.

By the way, as shown in FIG. 12A, the beat signal BT also contains, in addition to the reflected radar wave reflected by the target vehicle, for example, transmitted radar waves from a radar device mounted on the front of a vehicle which is traveling on an opposite lane of the road, and/or transmitted radar waves from a radar device mounted on the back of a vehicle that is traveling on the same lane of the road in front of the driver's vehicle, as well as noise from various sources.

The conventional radar device calculates the auto-correlation matrix Rxx based on the beat signal BT obtained every each cycle, (each cycle has a modulation period (1/fm) of the transmission signal) by the above method, and calculates an equivalent average of the auto-correlation matrices Rxx in a plurality of continuous cycles in time in order to obtain the section average correlation matrix R0. The conventional radar device then performs the above method to obtain the MUSIC spectrum based on the section average correlation matrix R0 expressed by the following equation (9), and then calculates the azimuth of the target object based on the MUSIC spectrum. This procedure can calculate the target azimuth θ with less influence of noise.

$$R0 = \frac{1}{SNN} \sum_{i=1}^{SNN} Rxx(i). \quad (9)$$

The section average correlation matrix R0 is calculated by the equation (9) using the equivalent average of the auto-correlation matrices Rxx for SNN cycles. In the equation (9), Rxx(i) designates the auto-correlation matrix Rxx of the i-th cycle in the auto-correlation matrices Rxx to be used for the equivalent average.

As described above, obtaining the section average correlation matrix R0 can suppress the influence of noise, and it is thereby possible to certainly obtain the target azimuth θ of the target object with higher accuracy when compared with the case of obtaining the target azimuth θ of the target object based on the auto-correlation matrix Rxx every cycle.

When the target position and traveling speed of the target vehicle are calculated based on the power spectrum in each cycle, calculating them using the peak frequencies obtained from the power spectrum of the beat signals BT can be easily affected by noise.

In order to eliminate the influence from noise, the conventional radar device performs the equivalent average of the power spectrum of the beat signal BT in a plurality of continuous cycles in time, and obtain the peak frequency from the averaged power spectrum, and then obtains the target position and traveling speed of the target object based on the peak frequencies in order to suppress the influence of noise.

However, the conventional radar device having the above structure makes it difficult to obtain the current position, traveling speed (or a target speed), and azimuth of a target object with high accuracy because of performing the equivalent average of the auto-correlation matrix and the power spectrums in a plurality of cycles. In other words, the conventional radar device has a limitation to obtain the target current position, the target traveling speed, and the target azimuth with high accuracy.

SUMMARY OF THE INVENTION

It is an object of the present invention to provide a radar device capable of calculating the target information of a target object such as the target position, the target traveling speed, and the target azimuth of the target object such as a preceding vehicle with high accuracy.

First of all, a description will be given of a mechanism of generating noise in an arrival wave which is transmitted by one's own vehicle (or a driver's vehicle) equipped with a radar device and then reflected by a target object such as a preceding vehicle. The noise is generated in and coming from other radar devices mounted on vehicles such as a preceding vehicle and a coming vehicle to the radar device mounted on the driver's vehicle, and added onto the arrival wave (or the reflected radar wave) transmitted from the target vehicle. The presence of those noise from other vehicles on the reflected radar wave decreases the accuracy of detecting target information such as the current position, the current traveling speed, and the azimuth of the target object.

The following explanation will consider that a radar wave component transmitted from other vehicles such as a coming vehicle and a preceding vehicle is added onto a received radar wave (or a reflected radar wave reflected by a target object), where the coming vehicle is a vehicle that is traveling on the opposite lane of the road, and the preceding vehicle is a vehicle that is traveling on the same lane of the road in front of the driver's vehicle, and a reflected radar wave is reflected by a target object such as a preceding vehicle.

In general, because radar devices produced by different manufactures have different characteristics such as a modulation period and a modulation gradient to a time axis, respectively, adding radar wave components transmitted from a coming vehicle as another vehicle (see FIG. 12B) onto a received signal Sr received by the driver's vehicle expands a frequency band of a beat signal BT which is a difference signal in frequency between a transmission signal Ss (or a sending signal) and a received signal Sr when the received signal Sr is mixed with the transmission signal Ss to produce the beat signal BT, where the radar wave components transmitted from another vehicle has different modulation period and gradient when compared with those of the radar wave components of the driver's vehicle.

Although a conventional radar device is equipped with a low pass filter to eliminate a high frequency range component of a beat signal containing noise, it is difficult to completely eliminate the noise components from the beat signal BT because the low frequency component also contains the noise components.

On the other hand, the beat signal BT passed through the low pass filter is converted from an analogue form into a digital form in order to be subjected to signal processing. When the beat signal BT containing noise components which cannot be eliminated by the low pass filter, a signal component of a high frequency range of more than a half of the sampling frequency used during the analogue to digital conversion appear on the digital signal as folding noise (spatial aliasing) which is not presence in the original signal.

Such noise components generate wrong peaks in a power spectrum during a frequency analysis, and will causes errors to calculate the current position, the traveling speed, and the azimuth of the target object. In the conventional radar devices, the above drawbacks prevent the accuracy of obtaining the target information from being improved and increased.

The above noise components locally appear, namely, appear in local parts on the time domain (or the time period) as shown in FIG. 12B.

Accordingly, although the presence of such noise components greatly affects the accuracy on calculating the target information when a radar device executes the equivalent average of auto-correlation matrices and power spectrum of a plurality of cycles, it is possible to improve and increase the accuracy on calculating the target information such as the target position, the target traveling speed, and the target azimuth of the target object by performing the equivalent average of the auto-correlation matrices and power spectrum in a plurality of cycles while suppressing the influence of locally-appearing noise components. The inventors according to the present invention have invented the radar device considering from such a viewpoint.

The concept of the radar device according to the present invention is not limited by a FMCW radar device disclosed in several embodiments, and can be applied to all types of radar devices capable of processing signals in which noise is locally present.

To achieve the above purposes, the present invention provides a radar device comprised of a transmitting and receiving means, a data collecting means, an auto-correlation matrix generating means, a section average correlation matrix generating means, a section average correlation matrix generating means, a target azimuth calculating means, a mixed noise amount estimating means, and a coefficient determining means.

The radar device according to the present invention is capable of calculating the azimuth of a target object based on received signals transmitted from the transmitting and receiving means corresponding to reflected radar waves received through a plurality of antenna elements. Those antenna elements form an array antenna. That is, a transmission wave as a radar wave transmitted from the transmitting and receiving means is reflected by the target object, and the reflected radar wave is received through the array antenna of the transmitting and receiving means.

The data collecting means receives the received signals of the antenna elements transferred from the transmitting and receiving means, obtains samples corresponding to the received signals, and generates unit data as a set of the samples of each of the antenna elements. The data collecting means repeatedly executes the series of the above processes.

The auto-correlation matrix generating means is configured to generate an auto-correlation matrix based on each unit data generated by the data collecting means.

The section average correlation matrix generating means is configured to execute a process of calculating a time average of a predetermined number of the auto-correlation matrix of each unit data generated by the auto-correlation matrix generating means. The section average correlation matrix generating means then generates an average correlation matrix per section (hereinafter, referred to as the "section average correlation matrix") as an auto-correlation matrix after the time average process.

The target azimuth calculating means is configured to calculate the azimuth of the target object, which reflects the transmission radar wave, based on the section average correlation matrices generated by the section average correlation matrix generating means.

The mixed noise amount estimating means is configured to estimate an amount of noise mixed or entered into each unit data. That is, the mixed noise amount estimating means estimates the amount of noise mixed or entered in the sample of each of the antenna elements forming the unit data.

The coefficient determining means is configured to determine a weighting coefficient to be applied to each of the predetermined number of the auto-correlation matrices, which is the target of calculating the average performed by the section average correlation matrix generating means, based on the amount of noise mixed in the unit data estimated by the mixed noise amount estimating means. This unit data is used on generating the auto-correlation matrix to which the weighting coefficient is applied.

That is, the section average correlation matrix generating means applies the weighting coefficients determined by the coefficient determining means to each of the predetermined number of the auto-correlation matrices as the targets in calculating the average thereof. The section average correlation matrix generating means then generates an auto-correlation matrix by performing the weighting average of the predetermined number of the auto-correlation matrices using the weighting coefficients obtained by the coefficient determining means.

The radar device having the above structure can obtain or calculate the azimuth of the target object such as a preceding vehicle with high accuracy when compared with the conventional radar devices because the radar device according to the present invention calculates the section average correlation matrix using the weighted auto-correlation matrices in consideration with the weighting coefficients which correspond to the amount of mixed noise, and then calculates the target azimuth of the target object based on the section average correlation matrix.

In more detail, because the conventional radar device executes the equivalent average of a predetermined number of auto-correlation matrices as the target of calculating the average, even if noise is locally present in the power spectrum, those noise greatly affect the calculation to calculate the section average correlation matrix. Therefore the conventional radar device makes it difficult to calculate the azimuth of the target object with high accuracy.

On the other hand, the radar device according to the present invention can suppress or avoid the influence of locally-generated noise, which greatly affect the calculation of the section average correlation matrix, because a small (or a decreased) weighting coefficient is applied to the auto-correlation matrix generated when local noise occurs. As a result, the radar device according to the present invention can calculate the target azimuth of the target object such as a preceding vehicle with high accuracy.

The concept of the radar device, capable of calculating the azimuth of the target object by calculating the weighted average of the frequency range data and estimating the reflected frequencies, can be applied to another type of a radar device capable of calculating target information such as a current position and traveling speed of the target object based on the power spectrums obtained by the frequency analysis. In other words, the concept of the radar device having the structure and functions according to the present invention previously described can be applied to another type of a radar device, not capable of calculating the target azimuth of a target object, but calculating the current position and traveling speed of the target object based on the power spectrums obtained by frequency analysis using the equations (1) to (4) previously described.

In accordance with another aspect of the present invention, there is provided a radar device capable of obtaining target information of a target object other than an azimuth of the target object. The radar device is comprised of a transmitting and receiving means, a data collecting means, a conversion means, a mixed noise amount estimating means, an average means, a target information calculating means, and a coefficient determining means.

The radar device according to the present invention is capable of obtaining the target information of the target object (such as a preceding vehicle) based on received signals transferred from the transmitting and receiving means. The received signals correspond to reflected radar waves reflected by the target object and then received through a plurality of antenna elements. That is, a transmission wave as the radar wave transmitted from the transmitting and receiving means is reflected by the target object, and the reflected radar wave is then received through an antenna.

The data collecting means is configured to repeatedly obtain samples of the received signals transferred from the transmitting and receiving means. The conversion means is configured to convert the samples in time domain to the sample in frequency domain (or in frequency period, for example, by Fourier transformation) in order to generate frequency range data.

The average means is configured to generate section average frequency range data as the frequency range data after time-average by performing a time average of the frequency range data corresponding to the predetermined number of the samples generated by the conversion means.

The target information calculating means is configured to obtain the target information based on the section average frequency range data generated by the average means.

On the other hand, the mixed noise amount estimating means is configured to estimate an amount of noise mixed or entered in each of the samples obtained by the data collecting means. The coefficient determining means is configured to determine a weighting coefficient, to be applied to each of the predetermined number of the frequency range data as the target of calculating the section average frequency data by the average means, based on the amount of mixed noise, in the sample before the conversion to the frequency range data, estimated by the mixed noise amount estimating means.

That is, the average means is configured to apply the weighting coefficient determined by the coefficient determining means to each of the predetermined number of the frequency range data, and generate the frequency range data, as the weighted average of the predetermined number of the section frequency range data using the weighting coefficient determined by the coefficient determining means.

In the radar device having the above structure according to the present invention, because the weighting coefficient corresponding to the amount of mixed noise is applied to the frequency range data as the target of calculating the average, and the weighted average of the section average frequency range data is calculated while considering the amount of mixed noise in the sample, it is possible to obtain the target information with high accuracy, when compared with the conventional radar device which performs the equivalent average process.

BRIEF DESCRIPTION OF THE DRAWINGS

A preferred, non-limiting embodiment of the present invention will be described by way of example with reference to the accompanying drawings, in which:

FIG. 9A is a flow chart showing the target estimation process repeatedly performed by the signal processing unit in the radar device according to a fifth embodiment of the present invention;

FIG. 9B is a flow chart showing the process of calculating the weighting coefficient performed by the signal processing unit in the radar device according to the fifth embodiment of the present invention;

FIG. 10 is a diagram showing a transmission signal Ss, a received signal Sr (or an arrival wave), and a beat signal BT to be used in the radar device according to the present invention;

DETAILED DESCRIPTION OF THE PREFERRED EMBODIMENTS

Figure 1:
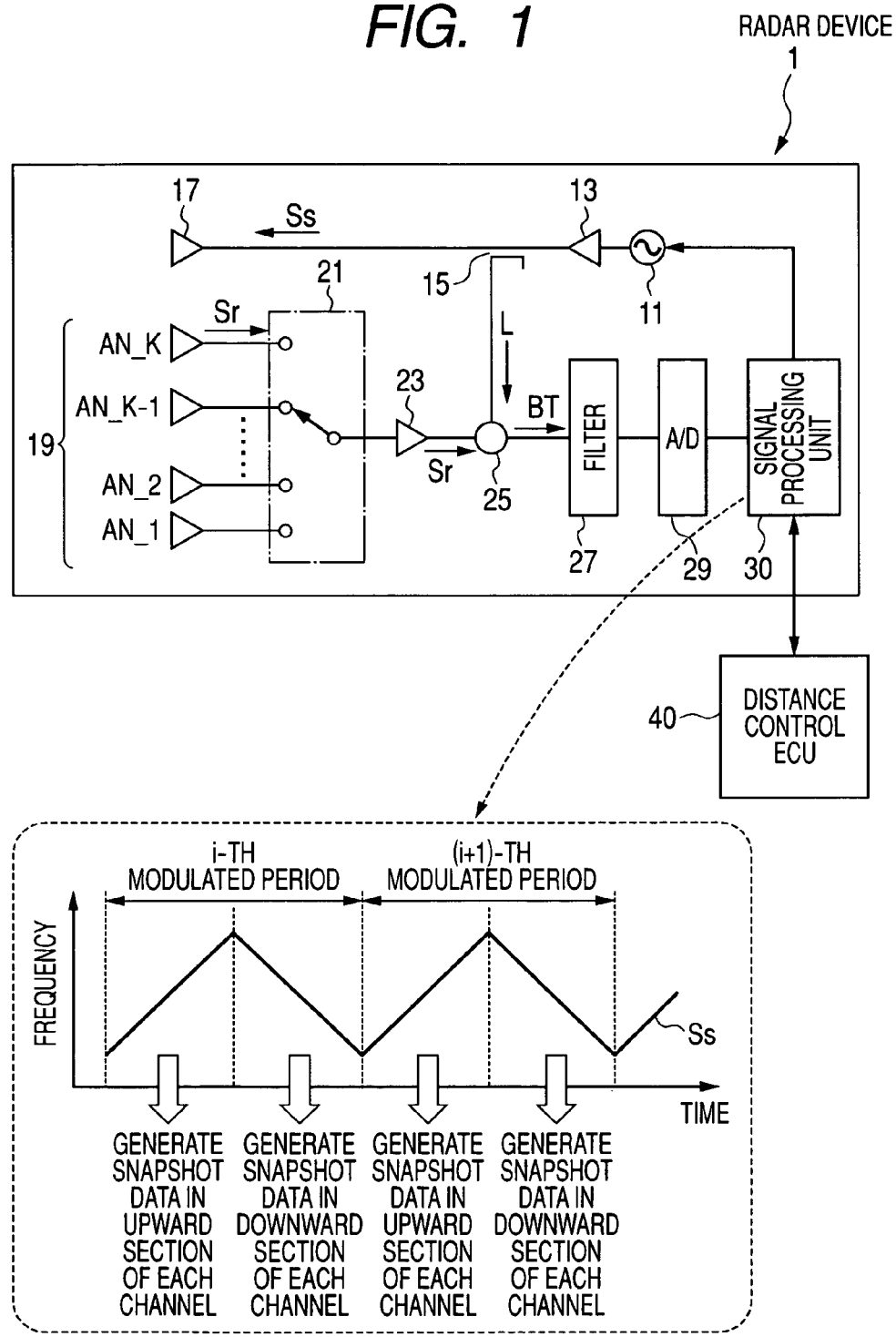
FIG. 1 is a block diagram showing the structure of a radar device according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of the radar device according to the first embodiment of the present invention with reference to FIG. 1 to FIG. 4.

FIG. 1 is a block diagram showing the structure of the radar device 1 according to the first embodiment of the present invention.

As shown in FIG. 1, the radar device 1 according to the first embodiment is a FMCW (Frequency Modulated Continuous Wave) type on-vehicle radar device. The radar device 1 is mainly comprised of an oscillator 11, an amplifier 13, a splitter 15, a transmitting antenna 17, and a receiving antenna 19 composed of K antenna elements (K is a positive integer). The oscillator 11 generates a high frequency signal in the millimeter wave band, the frequency of which is linearly and gradually decreased with the elapse of time. The amplifier 13 amplifies the high frequency signal generated by the oscillator 11. The splitter 15 splits the electric power of the output signal supplied from the amplifier 13 into a transmission signal Ss (see the upper portion in FIG. 10) and a local signal L. The transmitting antenna 17 transmits a radar wave corresponding to the transmission signal Ss. The receiving antenna 19 receives the reflected radar wave reflected by a target object such as a preceding vehicle which is traveling in front of the driver's vehicle. The receiving antenna 19 also receives various types of reflected radar wave and noise transmitted from other vehicles such as a coming vehicle, and a preceding vehicle.

The radar device 1 further has a receiving switch 21, an amplifier 23, a mixer 25, a filter 27, an analogue to digital (A/D) converter 29, and a signal processing unit 30. The receiving switch 21 sequentially selects one of the antenna elements AN_1 to AN_K which form the receiving antenna 19, and provides the received signal Sr received by the selected antenna element to the amplifier 23 in the following processing stage. The amplifier 23 receives received signal Sr provided from the receiving switch 21, and amplifies the received signal Sr. The mixer 25 receives the received signal Sr amplified by the amplifier 23 and the local signal L, and mixes them in order to generate the beat signal BT (see the bottom part in FIG. 10). The filter 27 as a low pass filter eliminates un-necessary signal components from the beat signal BT generated by the mixer 25. The A/D converter 29 converts the output from the filter 27 to digital data. The signal processing unit 30 is comprised of a microcomputer.

The signal processing unit 30 instructs the oscillator 11 to start and stop the operation thereof, and performs the signal processing using the beat signal BT in digital data supplied from the A/D converter 29 according to programs performed by the microcomputer. The signal processing unit 30 also performs the process to transmit the target information obtained by the signal processing to the distance control ECU 40.

The receiving antenna 19 is a linear array antenna composed of the K antenna elements which are aligned in line at a regular interval. Each of the antennal elements AN_1 to AN_K is set so that the beam width of each of the antenna elements AN_1 to AN_K includes the entire of the beam width of the transmitting antenna 17.

In the following explanation, the K antenna elements are assigned to the i-th antenna elements, where i=1 to K, and K is a positive integer). For example, the received signal obtained by the i-th antenna element will be referred to as the "i-channel signal").

In the radar device 1 according to the first embodiment having the above structure, the signal processing unit 30 instructs the oscillator 11 to start the oscillation of the high frequency signal. The high frequency signal generated by the oscillator 11 is amplified by the amplifier 13. The amplified signal is supplied to the splitter 15. The splitter 15 splits the electric power of the amplified signal in order to generate the transmission signal Ss and the local signal L.

Thus, the radar device 1 generates the transmission signal Ss and the local signal L, and transmits the transmission signal Ss through the transmitting antenna 17 as the frequency modulated radar wave to the target.

On the other hand, each of the antennal elements AN_1 to AN_K forming the receiving antenna 19 receives the radar wave (reflected radar wave) reflected by the target after transmitted from the transmitting antenna 17. Each of the antenna elements AN_1 to AN_K outputs the received signal Sr to the receiving switch 21.

The receiving switch 21 outputs the received signal Sr received by the i-th antenna element selected by the receiving switch 21 to the amplifier 23. The amplifier 23 amplifies the received signal Sr and outputs the amplified signal to the mixer 25.

The mixer 25 mixes the amplified signal supplied from the amplifier 23 and the local signal L supplied from the splitter 15 in order to generate the beat signal BT. The filter 27 eliminate un-necessary signal components from the beat signal BT generated by the mixer 25. The A/D converter 29 converts the beta signal BT supplied from the filter 27, and outputs the beat signal BT in digital form.

The receiving switch 21 selects each of the antennal elements AN_1 to AN_K so that all of the antennal elements AN_1 to AN_K are selected predetermined times per a modulation period (1/fm) of the radar wave. The A/D converter 29 performs the sampling in synchronization with the switching timing to convert the beat signal BT derived from the received signals supplied from the antennal elements AN_1 to AN_K into the beat signal in digital form.

The signal processing unit 30 executes the program to analyze the beat signal BT in digital form, and calculates the target distance between the preceding vehicle as the target object and the driver's vehicle (one's own vehicle), and the relative speed of the target to the traveling speed of the driver's vehicle. The signal processing unit 30 further calculates the angle of the target based on the traveling direction (or the direction of the antenna) of the driver's vehicle.

A description will now be given of the target estimation process which is repeatedly executed by the signal processing unit 30 in order to calculate the current position, the relation speed, and the azimuth of a target object such as a preceding vehicle.

Figure 2:
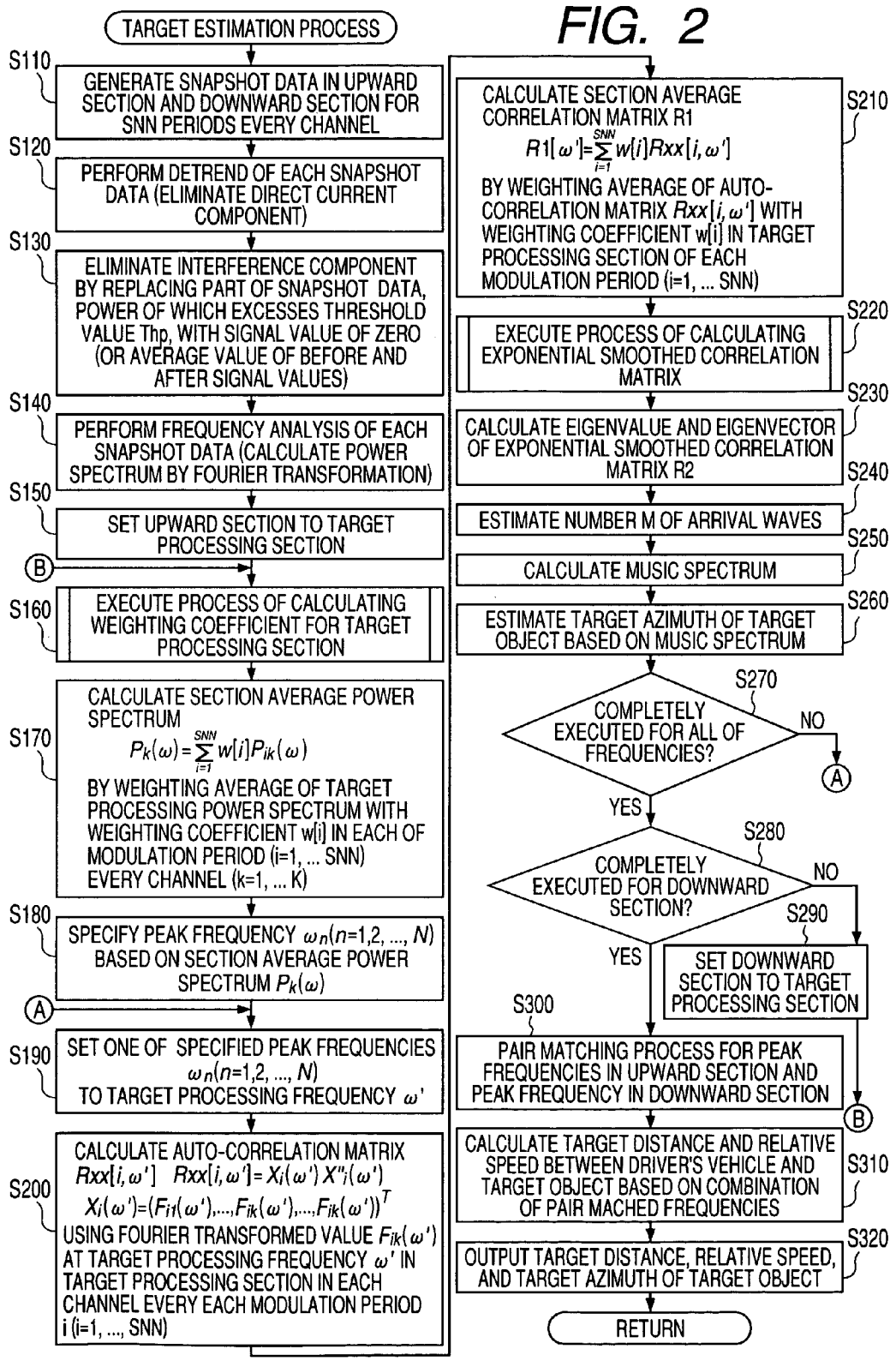
FIG. 2 is a flow chart showing a target estimation process executed by a signal processing unit in the radar device according to the first embodiment of the present invention shown in FIG. 1.

FIG. 2 is a flow chart showing the target estimation process executed by the signal processing unit 30 in the radar device 1 according to the first embodiment of the present invention shown in FIG. 1.

In the following explanation, one cycle of the target estimation process, which is repeatedly executed by the signal processing unit 30, will be referred to as the "target estimation cycle".

When starting the target estimation process, the signal processing unit 30 receives the beat signal BT in digital form of each channel supplied from the A/D converter 29 every modulation period in synchronization with the modulation period (1/fm) of the transmission signal. Specifically, the signal processing unit 30 receives the beat signal BT in digital form every upward section and downward section and then stores the received beat signal BT into a built-in memory such as a random access memory (RAM, not shown).

The signal processing unit 30 repeatedly executes, every modulation period, the process to generate snapshot data as sample of the beat signal BT every section and channel, as shown the bottom side in FIG. 1. This generates predetermined-number SSN snapshot data in each of the channels per the upward section and the downward section (step S110). That is, the above process generates the snapshot data in the SSN periods.

Specifically, the snapshot data is the time series data of the beat signal BT sampled by the A/D converter 29. It is acceptable to use the time series data composed of signal values in all time domains (or all time periods) of a target section (upward section or downward section) in one modulation period, or the time series data composed of signal values in a specified time section during a specified section.

The operation flow progresses to step S120 from step S110. The signal processing unit 30 performs detrend of each of snapshot data (step S120). Specifically, the signal processing unit 30 eliminates a direct current (DC) component from each of the snapshot data (see the right side in FIG. 7).

The operation flow progresses to step S130 from step S120. In step S130, the signal processing unit 30 performs the process for each of the snapshot data. This process replaces the signal value in the time domain (or time period), the power of which is more than a predetermined threshold value (or a predetermined judging value) Thp, with an average value of the signal values before and after the time domain in order to eliminate the interference component from each of the snapshot data.

The operation flow progresses to step S140 after completion of step S130. In step S140, the signal processing unit 30 performs the frequency analysis for each of the snapshot data. Those snapshot data are generated in step S110 and then processes in step S120 and S130. Specifically, the signal processing unit 30 executes an FFT (Fast Fourier Transform) process for each of the snapshot data. This FFT process converts time region of each of the snapshot data into frequency region, and generates Fourier transformed values (complex value). In step S140, the power spectrum of each of the snapshot data is obtained from the Fourier transformed values.

As known, the power spectrum can be obtained from the square of the absolute value of a Fourier transformed value.

After completion of step S140, the signal processing unit 30 sets the upward section to the target processing section (step S150), and then executes the series of steps S160 to S280.

Specifically, in step S160, the signal processing unit 30 performs the process of calculating a weighting coefficient for the target processing section, namely, the upward section.

The signal processing unit 30 then determines the weighting coefficient of the target processing section to be used when a weighted average is obtained in the following step S170.

Figure 3:
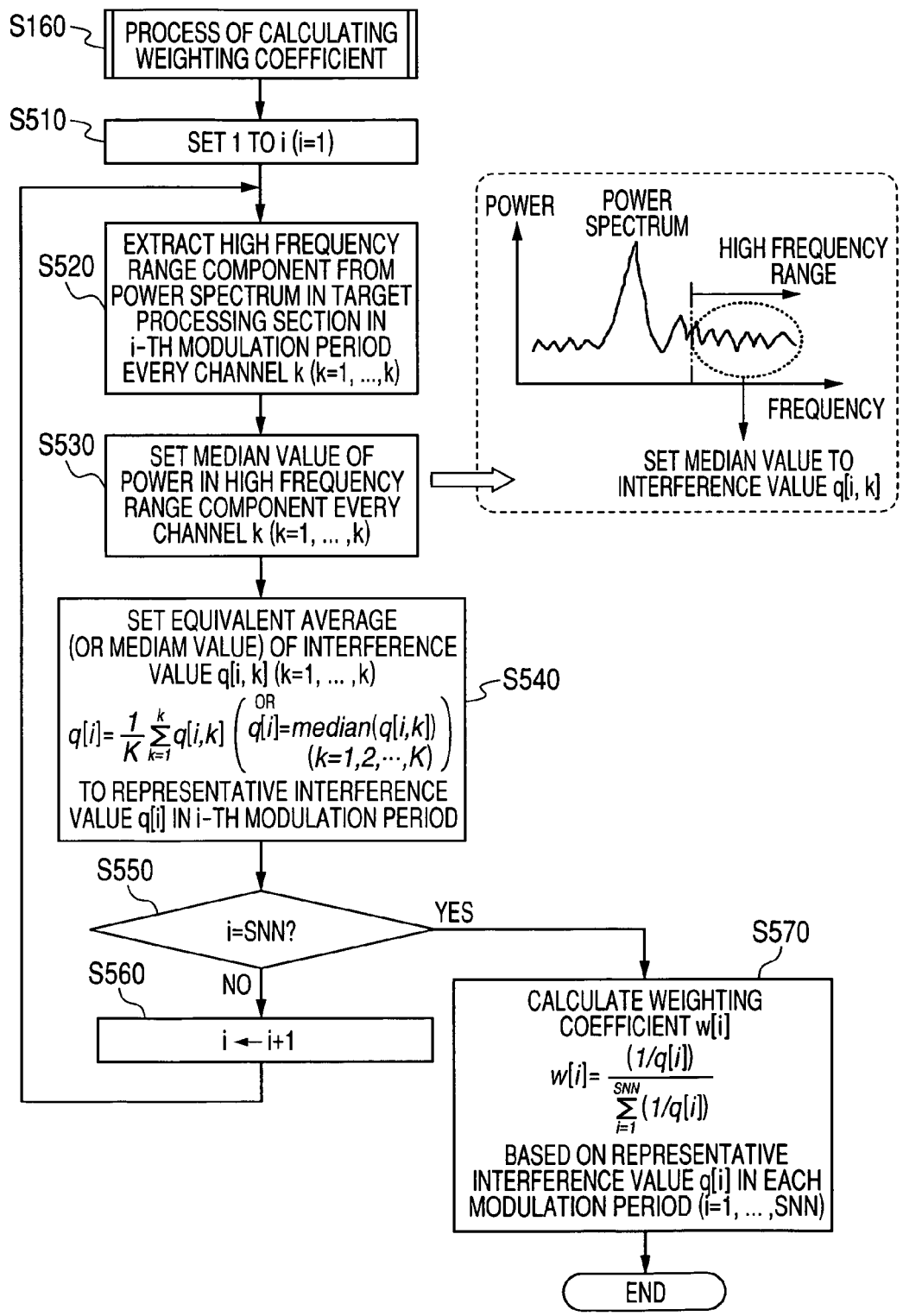
FIG. 3 is a flow chart showing the process of calculating a weighting coefficient performed by the signal processing unit in the radar device according to the first embodiment of the present invention shown in FIG. 1.

FIG. 3 is a flow chart showing the process of calculating the weighting coefficient performed by the signal processing unit 30 in the radar device 1 according to the first embodiment of the present invention.

When the signal processing unit 30 starts the process (in step S160) of calculating the weighting coefficient, the signal processing unit 30 sets the value of 1 to the variable i (1 - - - >i, step S510). The operation flow progresses to step S520 from the step S510.

In step S520, the signal processing unit 30 executes the process of extracting the high frequency component of more than the predetermined frequency $\omega_{max}$, which has been set in design work, from the power spectrum calculated based on the snapshot data in the target processing section during the i-th modulation period of the target channel.

In the following explanation, the snapshot data obtained in the i-th modulation period in all of the snap shot data in the SSN periods will be referred to as the "snapshot data of the i-th modulation period", where the head period is called to as the first modulation period".

In step S520, the signal processing unit 30 executes the process of extracting the component of a high frequency range of not less than the frequency $\omega_{max}$ from the power spectrum which is obtained by Fourier transformation of the snapshot data in the upward section in the K-th modulation period every channel when the target processing section is the upward section.

The above processes are executed from the first channel to the K-th channel. The operation flow goes to step S530. In step S530, the signal processing unit 30 determines the median value in the power of the extracted high frequency component every channel (in other words, every the extracted high frequency component).

The signal processing unit 30 sets the obtained median value to the interference value q[i, k], where i designates the i-th modulation period, and k indicates the k-th channel. By the way, the interference value q[i, k] indicates an analyzed noise value used in the claims.

That is, in step S530, the signal processing unit 30 repeatedly performs the process of setting, to the interference value q[i, k] in the i-th modulation period in the k-th channel (where, k=1, . . . , K), the medium value "median ($P_{ik}$ ($\omega > \omega_{max}$))" of the power spectrum $P_{ik}(\omega > \omega_{max})$ of the high frequency component which is extracted from the power spectrum $P_{ik}(\omega)$. This power spectrum $P_{ik}(\omega)$ is obtained by Fourier transformation of the snapshot data in the i-th modulation period of the k-th channel.

$$q[i,k] = \text{median}(P_{ik}(\omega > \omega_{max})) \quad (11).$$

As well known, the median value q[i, k] in the above equation (11) is a central value when the values are arranged by magnitude with the smallest one. That is, in step S530, the signal processing unit 30 sets the median one to the interference value q[i, k] when the power value of each of the frequencies in the high frequency range is arranged by the magnitude with the smallest value.

After completion of step S530, the operation flow goes to step S540. In step S540, the signal processing unit 30 sets the equivalent average value of the obtained interference value q[i, k] (k=1, . . . , K) of each channel to a representative interference value q[i] in the target processing section in the i-th modulation period. Such an interference value q[i, k] indicates the analyzed noise value used in the claims.

$$q[i] = \frac{1}{K} \sum_{k=1}^{K} q[i,k]. \quad (12)$$

(Example of modification) In step S540, it is acceptable to perform a modification to set the representative interference value q[i] of the target processing section in the i-th modulation period according to the following equation (13).

$$q[i] = \text{median}(q[i,k]) \; (k=1,2,\ldots,K) \quad (13).$$

That is, it is possible to set the median value of the representative interference values q[i, k] (k=1, . . . , K) in each of the channels in the i-th modulation period to the representative interference value q[i]. This interference value q[i] indicates an analyzed noise value used in the claims.

After completion of step S540, the operation flow goes to step S550. In step S550, the signal processing unit 30 detects whether or not the variable i is the same as SNN (i=SNN). When the detection result in step S550 indicates that the variable i is not SNN ("No" in step S550), the operation flow goes to step S560. In step S560, the variable i is incremented by one (i is rewritten with "i+1", or i=i+1). The operation flow is then returned to step S520.

The signal processing unit 30 executes the series of step S520 to step S550 using the incremented variable i.

The signal processing unit 30 calculates the representative interference values q[1] to q[SNN] in the target processing section from the i-th modulation period to the SNN-th modulation period.

When the signal processing unit 30 detects that the variable i becomes SNN (i=SNN) (when the detection result indicates "i=SNN" ("Yes" in step S550), the operation flow goes to step S570.

In step S570, the signal processing unit 30 calculates the weighting coefficient w[i] based on the representative interference values q[i] to q[SNN] in each of modulation periods from the first modulation period to the SNN-th modulation period by the following equations (14) and (15). This weighting coefficient w[i] is used for obtaining the weighted average in the target processing section in this target estimation cycle.

$$w[i] = \frac{1/q[i]}{\sum_{i=1}^{SNN}(1/q[i])}, \quad (14)$$

and $$\sum_{i=1}^{SNN} w[i] = 1, \quad (15)$$

where, w[i] indicates the weighting coefficient to be applied to the representative interference value q[i] in the i-the modulation period.

The equation (14) indicates the weighting coefficient w[i] when the interference value q[i] is not a decibel value. In other words, because the interference value q[i] is expressed by logarithm when the interference value q[i] is a decibel value, the weighting coefficient w[i] is calculated by the following equation (16).

$$w[i] = \frac{10^{-(q[i]/20)}}{\sum_{i=1}^{SNN} 10^{-(q[i]/20)}}. \qquad (16)$$

After the completion of step S570, the signal processing unit 30 completes the process of calculating the weighting coefficient.

When the process of calculating the weighting coefficient in step S160 is completed, the operation flow progresses to step S170. In step S170, the signal processing unit 30 calculates the average power spectrum $P_k(\omega)$ in the section by calculating the average in time of the power spectrums $P_{ik}(\omega)$ in the target processing section from the first to the SNN-th modulation periods using the following equation (17).

$$P_k(\omega) = \sum_{i=1}^{SNN} w[i] P_{ik}(\omega). \qquad (17)$$

That is, the signal processing unit 30 calculates the weighted average of the power spectrums $P_{ik}(\omega)$ in consideration with the interference amount (or the amount of mixed noise) in each of the modulation periods as the section average spectrum $P_k(\omega)$ in the k-th channels (k=1, ..., K) by applying the weighting coefficient w[i] to the power spectrum $P_{ik}(\omega)$ in the i-th modulation period.

When calculating the section average power spectrum $P_k(\omega)$ (k=1, ..., K) in each of the channels, the signal processing unit 30 determines the peak frequency which is commonly present in the section average power spectrum in each of the channels based on the obtained section average power spectrums $P_k(\omega)$ (k=1, ..., K). This peak spectrum is a peak frequency of more than the predetermined threshold value in the power spectrums.

Specifically, when the signal processing unit 30 determines the peak frequency commonly present in the section average power spectrum $P_k(\omega)$ (k=1, ..., K) in each of the channels, the signal processing unit 30 obtains the equivalent average value of the section average power spectrum $P_k(\omega)$ (k=1, ..., K) in each of the channels to calculate the representative power spectrum $p(\omega)$ expressed by the following equation (18).

$$P(\omega) = \frac{1}{K} \sum_{k=1}^{K} P_k(\omega), \qquad (18)$$

where N designates the number of peak frequencies.

The signal processing unit 30 selects the peak frequency of more than the predetermined threshold value, as the peak frequency $\omega_n$ (n=1, ..., N), in the representative power spectrums $p(\omega)$.

(Example of modification) The present invention is not limited by this, for example, in step S180, without calculating the representative power spectrum $P(\omega)$ by using the section average power spectrum $P_k(\omega)$ (K–1, ..., K) in each channel, it is possible to specify the peak frequency $\omega_n$ (n=1, ..., N) based on the representative power spectrum $P(\omega)$, where the section average power spectrum $P_{k0}(\omega)$ in unique representative channel (k0-th channel) is assumed as the representative power spectrum $P(\omega)$.

When the signal processing unit 30 completes the determination of the peak frequency $\omega_n$ (n=1, ..., N), the operation flow progresses to step S190 from step S180. In step S190, the signal processing unit 30 sets one of the specified peak frequencies $\omega_n$ to the target processing frequency $\omega$.

The operation flow progresses to step S200. In step S200, the signal processing unit 30 generates the auto-correlation matrix Rxx [i, $\omega$'] in the target processing section according to the following equations (19) and (20) from the Fourier transformed value $F_{ik}(\omega')$ at the target processing frequency $\omega'$, where the target processing frequency $\omega'$ is obtained by Fourier transformation of the snapshot data during the target processing section of each of the channels every modulation period from the first modulation period to SNN-th modulation period.

$$Rxx[i, \omega'] = X_i(\omega') X_i^H(\omega') \qquad (19), \text{ and}$$

$$X_i(\omega') = (F_{i1}(\omega'), \ldots, F_{ik}(\omega'), \ldots, F_{iK}(\omega'))^T \qquad (20),$$

where $F_{ik}(\omega')$ indicates the Fourier transformed value at the target processing frequency $\omega'$ which is obtained by Fourier transformation of the snapshot data during the target processing section in the i-th modulation period in the k-th channel. The auto-correlation matrix Rxx [i, $\omega'$] represents the auto-correlation matrix of the received vector $X_i(\omega')$. The received vector $X_i(\omega')$ is a vector in which Fourier transformed values $F_{ik}(\omega')$ at the target processing frequency $\omega'$ in the target processing section in the i-th modulation period in each of the channels (see the equation (20)).

That is, in step S200, the signal processing unit 30 calculates the SNN auto-correlation matrices Rxx [i, $\omega'$] (i=1, ..., SNN) which correspond to the modulation periods from the first modulation period to the SNN modulation period.

After the completion of the process of calculating the above auto-correlation matrices, the operation flow proceeds to step S210. In step S210, the signal processing unit 30 performs the weighting mans process of each of the modulation periods from the first modulation period to the SNN modulation period. This process is expressed by the following equation (21).

$$R1[\omega'] = \sum_{i=1}^{SNN} w[i] Rxx[i, \omega']. \qquad (21)$$

That is, the signal processing unit 30 calculates the section average correlation matrix R1 [$\omega'$] by applying the weighting coefficient w[i] of the i-th modulation period determined based on the representative interference value q[i] to the auto-correlation matrix Rxx [i, $\omega'$] of the i-th modulation period. This section average correlation matrix R1 [$\omega'$] is assumed as the time average of the auto-correlation matrix Rxx [i, $\omega'$] obtained by calculating a weighted average of the auto-correlation matrix Rxx [i,$\omega'$] with the weighting coefficient w[i] corresponding to the respective i-th modulation period.

After completion of calculating the section average auto-correlation matrix R1 [$\omega'$], the operation flow proceeds to step S220. In step S220, the signal processing unit 30 executes the process of calculating the exponential smoothed correlation matrix shown in FIG. 4.

Figure 4:
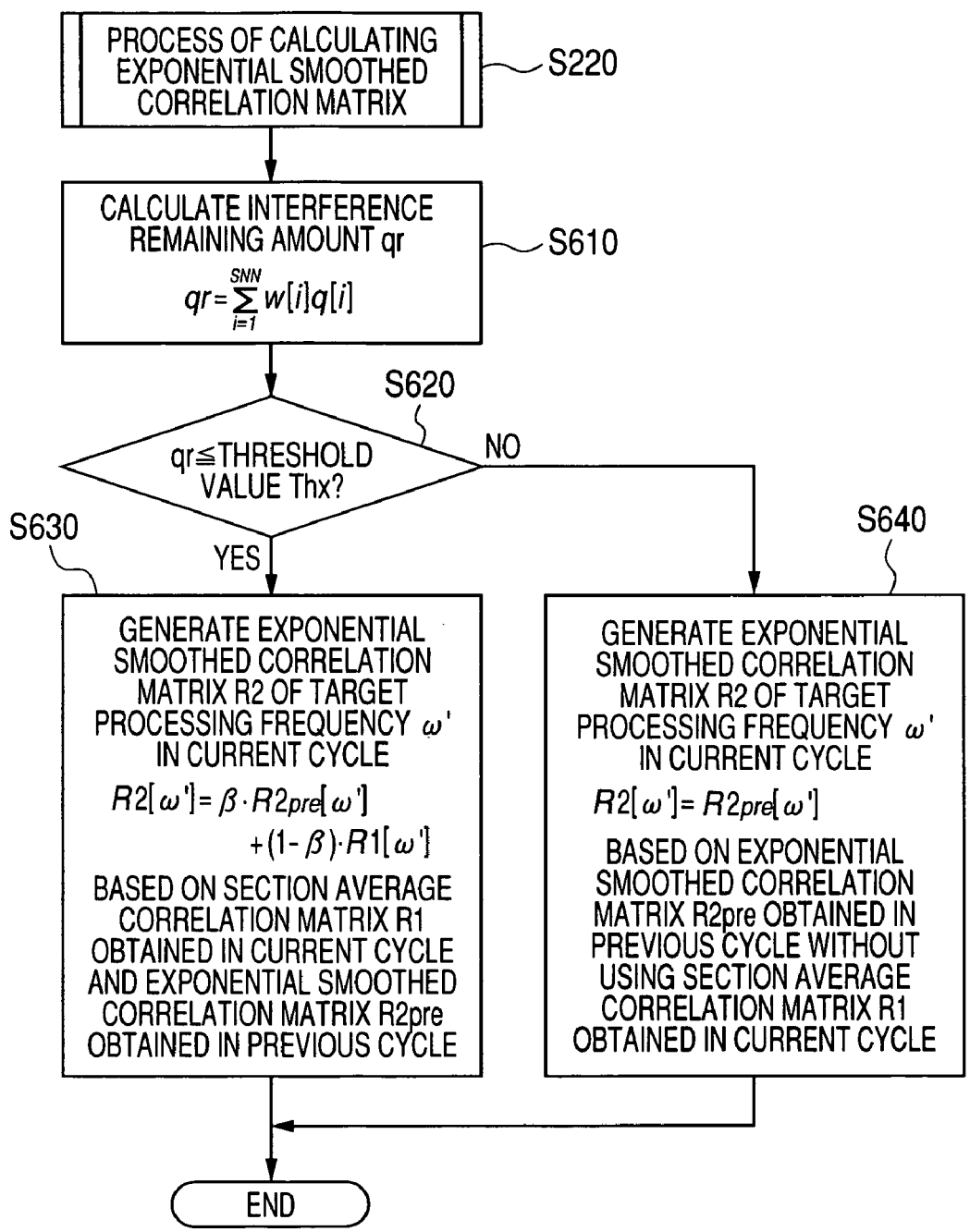
FIG. 4 is a flow chart showing the process of calculating an exponential smoothed correlation matrix performed by the signal processing unit in the radar device according to the first embodiment of the present invention shown in FIG. 1.

FIG. 4 is a flow chart showing the process of calculating the exponential smoothed correlation matrix performed by the signal processing unit 30 in the radar device 1 according to the first embodiment of the present invention shown in FIG. 1.

On initiating the process of calculating the exponential smoothed correlation matrix, the signal processing unit 30 firstly calculates the interference remaining value qr based on the representative interference value q[i] and the weighting coefficient w[i] by the following equation (22) (step S610).

$$qr = \sum_{i=1}^{SSN} w[i]q[i], \quad (22)$$

where q[i] designates the representative interference value in the target processing section in each of the modulation periods from the first modulation period to the SNN modulation period, and w[i] indicates the weighting coefficient in the target processing section.

That is, the signal processing unit 30 calculates the interference remaining value qr by executing the weighting average process of the representative interference value q[i] from the first modulation period to the SNN modulation period, in which the weighting coefficient w[i] is applied to the representative interference value q[i] of the i-th modulation period (i=1, . . . , and SNN).

After completion of calculating the interference remaining value qr, the operation flows progresses to step S620.

In step S620, the signal processing unit 30 compares the calculated interference remaining value qr with the predetermined threshold value Thx which is determined in advance in order to determine whether or not the latest section average correlation matrix R1[ω'] is used to the process of calculating the exponential smoothed correlation matrix.

Specifically, when the interference remaining value qr is not more than the threshold value Thx, the signal processing unit 30 determines the process of calculating the exponential smoothed correlation matrix to use the latest section average correlation matrix R1[ω'] ("Yes" in step S620).

On the other hand, when the interference remaining value qr is more than the threshold value Thx, the signal processing unit 30 determines the process of calculating the exponential smoothed correlation matrix not to use the latest section average correlation matrix R1 [ω'] ("No" in step S620) because of being a high possibility of including strong noise component in the beat signal BT corresponding to the latest section average correlation matrix R1[ω'].

When the detection result in step S620 indicates "Yes", the operation flow progresses to step S630. In step S630, the signal processing unit 30 calculates the exponential smoothed correlation matrix R2 [ω'] of the target processing frequency ω' by the following equation (23).

$$R2[\omega'] = \beta \cdot R2_{pre}[\omega'] + (1-\beta) \cdot R1[\omega'] \quad (23),$$

where β is a forgetting factor taking a range within 0<β<1. Specifically, it is possible to use a fixed value as the forgetting factor, which is determined in design work, or to determine the forgetting factor β according to the interference remaining value qr. The value R2$_{pre}$[ω'] represents the exponential smoothed correlation matrix R2[ω'] of the target processing frequency ω' calculated in the previous target estimating cycle.

There is a case of not having any previous exponential smoothed correlation matrix R2$_{pre}$[ω'] to be used for calculating the exponential smoothed correlation matrix R2[ω']. In this case, the signal processing unit 30 sets the latest section average correlation matrix R1[ω'] to the exponential smoothed correlation matrix R2[ω'] (R2[ω']=R1[ω']) in order to generate the exponential smoothed correlation matrix R2[ω'].

After completion of step S630, the signal processing unit 30 completes the process of calculating the exponential smoothed correlation matrix.

On the other hand, the judgment result in step S620 indicates "No", the operation flow goes to step S640. In step S640, the signal processing unit 30 sets the current exponential smoothed correlation matrix R2[ω'] to the exponential smoothed correlation matrix R2$_{pre}$[ω'] of the target processing frequency ω' calculated in the previous target estimation cycle without using the latest section average correlation matrix R1[ω'].

When there is a case of not having any exponential smoothed correlation matrix R2$_{pre}$[ω'] to be used for setting the exponential smoothed correlation matrix R2[ω'], in particular, the signal processing unit 30 sets the latest section average correlation matrix R1 [ω'] to the exponential smoothed correlation matrix R2[ω'] (R2[ω']=R1[ω']). The signal processing unit 30 then completes the process of calculating the exponential smoothed correlation matrix.

After completion of the process in step S220, the operation flow progresses to step S230. In step S230, the signal processing unit 30 calculates the eigenvalues $\lambda_1$, . . . , and $\lambda_K$ (where, $\lambda_1$, $\geq \lambda_2$, $\geq$ . . . $\lambda_K$) of the exponential smoothed correlation matrix R2[ω'] calculated in step S220, and further calculates the eigenvectors $e_1$, . . . , $e_K$ corresponding to each eigenvalue. In step S240, the signal processing unit 30 estimates that the eigenvalue M of more than the predetermined threshold value corresponding to the thermal noise power is the arrival wave (namely, the reflected radar wave). In step S250, the signal processing unit 30 obtains the MUSIC spectrum according to the equation (8) using the steering vector a(θ) as a complex response of the array antenna to the azimuth θ, and the noise eigenvector $E_N$ (see the equation (7)) composed of eigenvectors $e_{M+1}$, . . . , $e_K$ corresponding to (K-M) eigenvalues $\lambda_{M+1}$, . . . , and $\lambda_K$ of not more than the thermal noise power (threshold value).

The operation flow progresses to step S260. In step S260, the signal processing unit 30 estimates that the target azimuth is the value $P_{MU}(\theta)$ in the obtained MUSIC spectrum, which is the azimuths θ (maximum number of M) corresponding to each of peak values of not less than the predetermined threshold value.

After completion of the step S260, the operation flow progresses to step S270. In step S270, the signal processing unit 30 detects whether or not the series of step S200 to S260 has been completed for all of the peak frequencies $\omega_n$ (n=1, . . . , N).

When the signal processing unit 30 detects that the series of steps S200 to 5260 has not been performed for all of the peak frequencies $\omega_n$ (n=1, . . . , N) ("No" in step S270), the operation flow goes to step S190. In step S190, the signal processing unit 30 selects one of the un-processed peak frequencies $\omega_n$, and sets the selected peak frequency to the target processing frequency ω'. The signal processing unit 30 calculates the MUSIC spectrum at the target processing frequency ω' to estimate the target azimuth (step S260).

The signal processing unit 30 obtains the MUSIC spectrum every each of the peak frequencies $\omega_n$ (n=1, . . . , N) specified in step S180 in order to estimate the target azimuth θ based on each of the MUSIC spectrums.

When detecting that the series of step S200 to S260 is performed for all of the peak frequencies $\omega_n$ (n=1, . . . , N) specified in step S180 ("Yes" in step S270), the signal processing unit 30 detects whether the current target processing section is the upward section or the downward section (step S280).

Because the target processing section is the upward section when the signal processing unit 30 firstly executes the step S280, the signal processing unit 30 controls so that the detection result in step S280 indicates "No".

When the detection result in step S280 indicates "No", the signal processing unit 30 sets the downward section to the target processing section (step S290), and the operation flow is returned to step S160.

The signal processing unit 30 executes the series of steps S160 to S270 for the downward section.

The signal processing unit 30 performs the above procedures in order to obtain the target azimuth θ based on the MUSIC spectrums corresponding to each of the peak frequencies in the downward section After completion of calculating the target azimuth based on the MUSIC spectrums for all of the peak frequencies in the downward section, the signal processing unit 30 detects that the detection result in step S270 indicates "Yes", and the detection result in step S280 indicates "Yes". The operation flow progresses to step S300.

In step S300, the signal processing unit 30 performs a pair matching process using as indexes the target azimuth θ of each of the peak frequencies in the upward section and the target azimuth θ of each of the peak frequencies in the downward section As previously described, the upward section and the downward section have different frequencies fb1 and fb2 of the beat signal BT corresponding to the reflected radar wave. Therefore the signal processing unit 30 performs the pair matching process to obtain a pair of the peak frequencies (as the pair of the peak frequencies corresponding to the above frequencies fb1 and fb2) in the same reflected radar wave.

In step S310, the signal processing unit 30 calculates the target distance D and the relative speed V of the target object observed from the driver's vehicle by using the equations (1) to (4) every pair based on the peak frequencies in the upward section and the downward section, which is determined as a pair by the pair matching process.

On assuming the peak frequency in the upward section as the frequency fb1, and the peak frequency in the downward section as the frequency fb2, the signal processing unit 30 calculates the target distance D and the relative speed V of the target object observed from the driver's vehicle by using the equations (1) to (4) every pair based on the peak frequencies in the upward section and the downward section, which is determined as a pair by the pair matching process.

The signal processing unit 30 outputs the target information such as the target distance D, the relative speed V, and the target azimuth θ based on the above calculation result to the distance control ECU 40 (step S320). The signal processing unit 30 then completes the target estimation process.

As described above in detail, the radar device 1 according to the first embodiment can obtain the target azimuth θ with high accuracy when compared with the conventional radar devices because of calculating the target azimuth θ based on the section average correlation matrix R1 which is obtained by weighting the auto-correlation matrix Rxx based on the interference value q in each of the modulation periods.

That is, because the conventional radar devices obtains the section average correlation matrix R1 using the equivalent average of a predetermined number of auto-correlation matrices, the section average correlation matrix R1 is greatly influenced by interference when the received signal (reflected radar wave) corresponding to the auto-correlation matrix Rxx as the target of the equivalent average process has such strong interference. As a result, the conventional radar device makes it difficult to obtain the target azimuth with high accuracy.

On the other hand, the radar device 1 according to the first embodiment of the present invention can calculate the section average correlation matrix R1 by using a decreased weighting coefficient for the auto-correlation matrix Rxx in the section when a local interference occurs. This avoids the influence of such a local interference to the section average correlation matrix R1, and as a result, the radar device 1 according to the first embodiment can obtain the target azimuth θ with high accuracy.

Further, the radar device 1 according to the first embodiment calculates the section average power spectrum $P_k(\omega)$ by performing the weighting average process of the power spectrum $P_{jk}(\omega)$ using the weighting coefficient w[i] in each of the modulation periods, and determines the peak frequency (the frequency of the reflected radar wave component) based on the section average power spectrum $P_k(\omega)$ in this section. The radar device 1 can therefore estimate the frequency of the reflected radar wave with high accuracy, and as a result can obtain the target azimuth with high accuracy.

The conventional radar device calculates the equivalent average of the power spectrum in each of the modulation periods in order to obtain the section average power spectrum. On the other hand, the radar device 1 according to the first embodiment firstly calculates the section average power spectrum in consideration with the interference value q in order to suppress the influence of a local noise, and determines the peak frequency $\omega_n$ based on the section average power spectrum. Therefore the radar device 1 according to the first embodiment can obtain the target azimuth with high accuracy.

The relationship between the components used in the embodiment and the means used in claims according to the present invention is as follows.

The transmitting and receiving means corresponds to the components other than the signal processing unit 30 in the radar device 1.

The data collecting means corresponds to the means of the step S110 executed by the signal processing unit 30. The unit data corresponds to a set of snapshot data in each of the channels which are generated every section in each of the modulation periods.

The auto-correlation matrix generating means corresponds to the process in step S200 in which the signal processing unit 30 generates the auto-correlation matrix Rxx in the target processing section every modulation period.

The section average correlation matrix generating means corresponds to the process in step S210 executed by the signal processing unit 30.

The target azimuth calculating means corresponds to the series of processes from step S220 to step S260 executed by the signal processing unit 30.

The mixed noise amount estimation means corresponds to the processes of step S520 to step S540 executed by the signal processing unit 30.

The amount of mixed noise into unit data corresponds to the representative interference value q[i] every modulation period.

The noise-analysis target antenna element corresponds to all of the antenna elements which form the receiving antenna 19. In one modification, the signal processing unit 30 performs the processes of step S530 and step S540 to obtain the representative interference value q[i] for a part of the antenna elements.

In step S520, the signal processing unit 30 according to the first embodiment obtains the median value in the power of the high frequency component, and sets the obtained median value to the interference value q[i,k]. The present invention is not limited by this. For example, it is possible that the signal processing unit 30 obtains the equivalent average value of the power of the high frequency component in step S520, and then sets the obtained equivalent average value to the interference value q [i,k].

That is, it is possible for the radar device 1 to set the equivalent average value of the power of each of the frequencies ($\omega > \omega_{max}$) in the high frequency range indicated in the power spectrum to the interference value q[i,k].

The coefficient determining means corresponds to the process of step S570 executed by the signal processing unit 30.

The conversion means corresponds to the process of step S140 executed by the signal processing unit 30.

The frequency range data corresponds to the power spectrum obtained by Fourier transformation of the snapshot data.

The frequency estimation means corresponds to the processes of step S170 and step S180 executed by the signal processing unit 30.

The operation of estimating the frequency of the reflected radar wave corresponds to the operation of specifying the peak frequency executed by the signal processing unit 30.

The average means corresponds to the process of step S170 executed by the signal processing unit 30.

The section average frequency range data corresponds to the section average power spectrum $P_k(\omega)$.

The smoothed correlation matrix generating means in the azimuth calculating means corresponds to the processes of step S630 and step S640 executed by the signal processing unit 30.

The adoption judging means corresponds to the processes of step S610 and step S620 executed by the signal processing unit 30.

The target information calculating means corresponds to the processes of step S180, step S300, and step S310 executed by the signal processing unit 30.

Second Embodiment

A description will be given of the radar device according to the second embodiment of the present invention with reference to FIG. 5.

Figure 5:
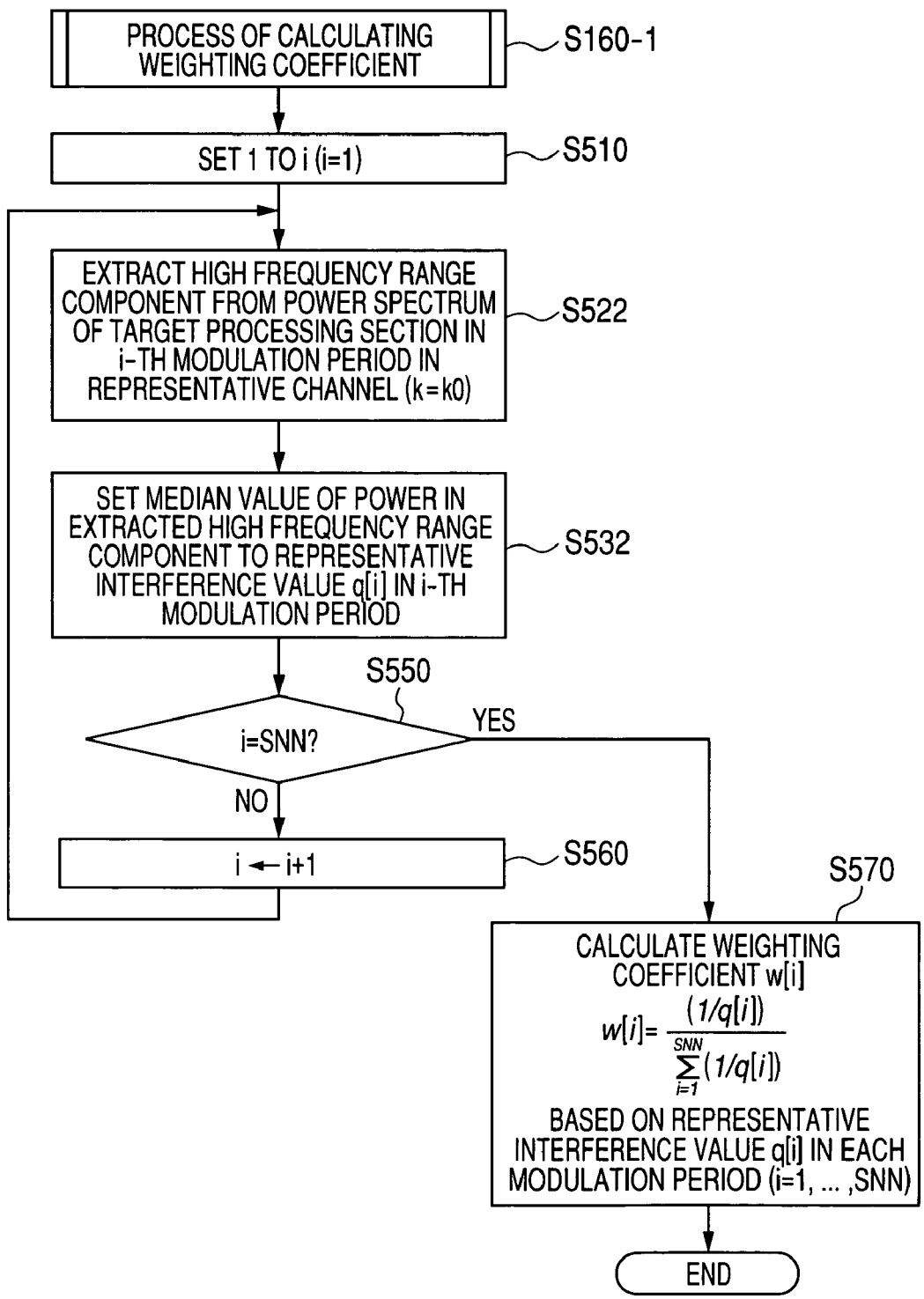
FIG. 5 is a flow chart showing the process of calculating the weighting coefficient performed by the signal processing unit in the radar device according to a second embodiment of the present invention.

FIG. 5 is a flow chart showing another process of calculating the weighting coefficient performed by the signal processing unit 30 in the radar device 1 according to the second embodiment of the present invention.

The signal processing unit 30 in the radar device 1 according to the second embodiment performs the weighting coefficient calculating process S160-1 which is different in operation from the weighting coefficient calculating process of step S160 in the first embodiment. Because other operations of the second embodiment are the same as those in the first embodiment, the explanation of the same processes is omitted here for brevity.

In the second embodiment, one of K channels from the first channel to the K-th channel is used as a representative channel which is determined in advance in the design work.

When starting the weighting coefficient calculating process, the signal processing unit 30 sets 1 to the variable i (i=1, step S510). The signal processing unit 30 executes the process of extracting the high frequency component (power spectrum) of more than the predetermined frequency $\omega_{max}$, which is determined in advance in design work, from the power spectrum obtained by Fourier transformation of the snapshot data in the target processing section in the i-th modulation period of the representative channel (step S522).

The operation flow then progresses to step S532. In step S532, the signal processing unit 30 obtains the median value of the extracted power spectrum of the high frequency component in the representative channel, and then sets the obtained median value to the representative interference value q[i].

When the representative is the k-th=k0 channel, the representative interference value q[i] becomes q[i]=median ($P_{ik0}$ ($\omega$)>$\omega_{max}$).

After completion of the process in step S532, the operation flow progresses to step S550. In step S550, the signal processing unit 30 detects whether or not the variable i is SNN (i=SNN). When the detection result in step S550 indicates that the variable i is not the same as SNN, the operation flow goes to step S560. In step S560, the variable i is incremented by one (i=i+1). The operation flow progresses to step S522.

The signal processing unit 30 sets the representative interference value q[1] to q[SNN] by the above procedure in the target processing section in each of the modulation period from the first to the SNN-th modulation periods.

When the variable i is the same as SNN (i=SNN) ("Yes" in step S550), the operation flow progresses to step S570.

In step S570, like the procedure of the first embodiment, the signal processing unit 30 calculates, using the equation (14) or (16), the weighting coefficient w[i] (i=1, ..., and SNN) to be used in the weighting average calculation process for the target processing section in the current target estimation cycle based on the representative interference values q[1] to q[SNN] in the target processing sections in each of the modulation period from the first to the SNN-th modulation periods.

After completion of the process in step S570, the signal processing unit 30 completes the weighting coefficients calculating process.

As described above, it is also possible to suppress increasing the load of the signal processing unit 30 when the representative channel is selected, and the weighting coefficient is then calculated based on the power spectrum of this representative channel.

When the weighting coefficient w[i] is calculated in the procedure shown in the second embodiment, it is preferable for the signal processing unit 30 to calculate the section average power spectrum $P_k(\omega)$ only for the representative channel in step S170, assume the section average power spectrum $P_k(\omega)$ of the representative channel as the representative power spectrum $P(\omega)$, specify the peak frequency $\omega_n$ (n=1, ..., N) based on the representative power spectrum $P(\omega)$, and perform subsequent steps in view of suppressing the calculation load.

Further, like the process in step S530 in the first embodiment, it is possible for the signal processing unit 30 to set equivalent average value of the power of a high frequency range component to the interference value q[i] instead of the median value of the power of a high frequency range component.

The mixed noise amount estimating means in claims corresponds to the processes in step S522 and S532 executed by the signal processing unit 30.

Third Embodiment

A description will be given of the radar device according to the third embodiment of the present invention with reference to FIG. 6.

Because the processes of the third embodiment other than the weighting coefficient calculating process performed in step S160 are same as those in the first embodiment, the weighting coefficient calculating process will be mainly explained.

Figure 6:
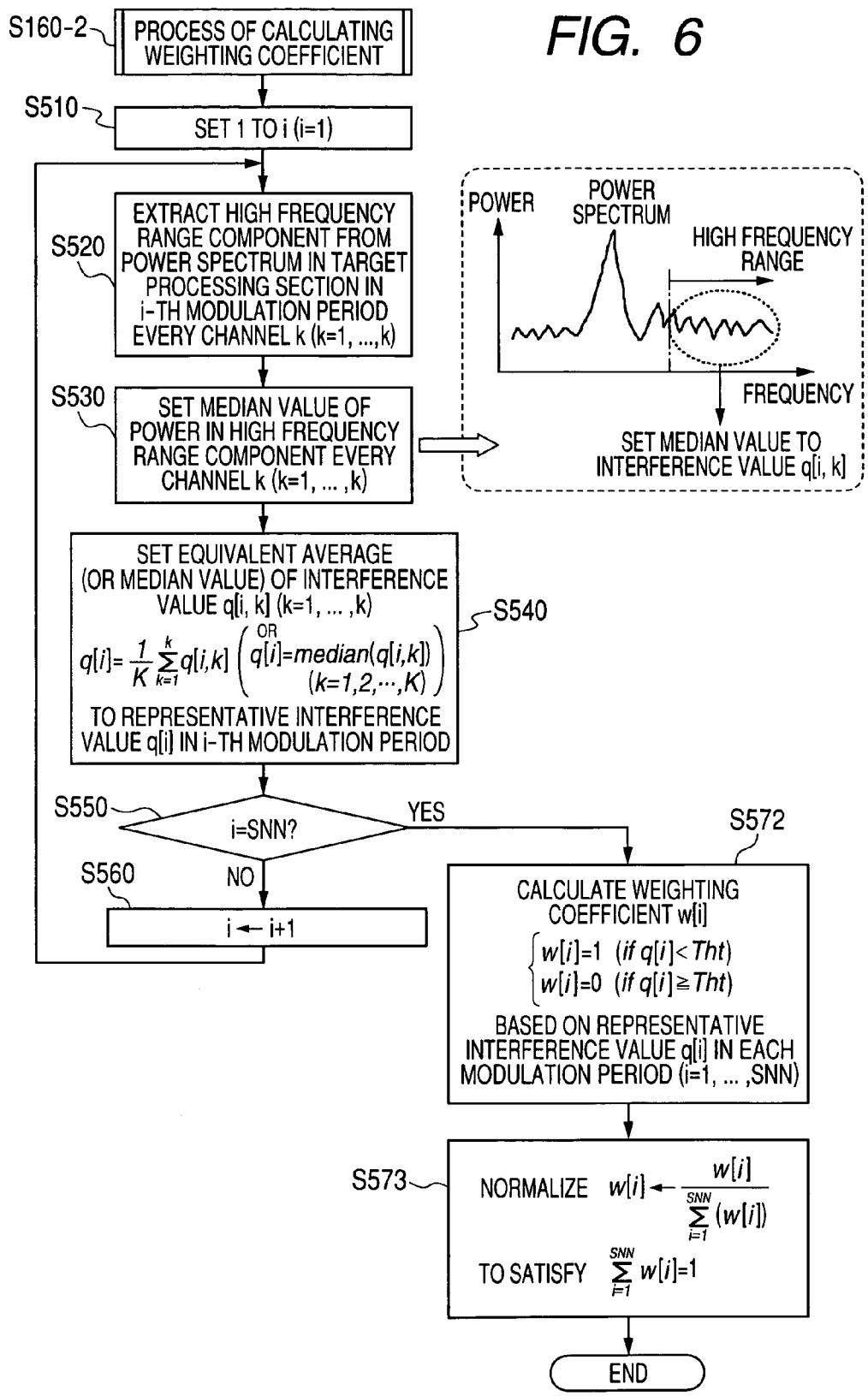
FIG. 6 is a flow chart showing the process of calculating the weighting coefficient performed by the signal processing unit in the radar device according to a third embodiment of the present invention.

FIG. 6 is a flow chart showing another process of calculating the weighting coefficient performed by the signal processing unit in the radar device 1 according to the third embodiment.

When starting the weighting coefficient calculating process shown in FIG. 6, the signal processing unit 30 executes the series of steps S510 to S560, like the first embodiment. When the detection result in step S550 indicates that the variable i=SNN ("Yes" in step S550), the operation flow progresses to step S572. In step S572, the signal processing Unit 30 calculates the weighting coefficient w[i] by the following equation (24), which is used for calculating the weighted average in the target processing section in the current target estimation cycle based on the representative interference values q[1] to q[SNN] in the target processing section in each of the modulation period from the first modulation period to the SNN-th modulation period.

$$\begin{cases} w[i] = 1 & (\text{if } q[i] < Tht) \\ w[i] = 0 & (\text{if } q[i] \geq Tht) \end{cases} \quad (24)$$

When the representative interference value q[i] in the i-th modulation period is less than the predetermined value Tht which is determined in advance, the signal processing unit 30 sets the value of 1 to the weighting coefficient q[i] in the i-th modulation period.

On the other hand, when the representative interference value q[i] in the i-th modulation period is not less than the predetermined value Tht which is determined in advance, the signal processing unit 30 sets zero to the weighting coefficient q[i] in the i-th modulation period.

After completion of the process in step S572, the operation flow progresses to step S573. In step S573, the signal processing unit 30 performs the standardization of each of the weighting coefficients w[i] (i=1, . . . , SNN) so that the total sum of the weighting coefficients w[i] becomes the value of 1.

That is, the signal processing unit 30 updates each of the weighting coefficients w[i] (i=1, . . . , SNN) is updated with the value which is set in step S572, as expressed by the following equation (25).

$$w[i] \leftarrow \frac{w[i]}{\sum_{i=1}^{SNN} (w[i])}. \quad (25)$$

In the third embodiment, the signal processing unit 30 then completes the weighting coefficient calculation process shown in FIG. 6.

According to the weighting coefficient calculation process in the third embodiment, it is possible to decrease the calculation load of the signal processing unit 30 rather than the calculation load of the first embodiment.

It is possible to replace the series of steps S510 to S560 in the third embodiment with the series of steps S510 to S560 in the second embodiment.

The third embodiment can decrease the calculation load of the signal processing unit 30 because the weighting coefficient w[i] is calculated based only on the interference value of the representative channel.

The coefficient determining means in claims corresponds to the processes in step S572 and S573 executed by the signal processing unit 30.

Fourth Embodiment

A description will be given of the radar device according to the fourth embodiment of the present invention with reference to FIG. 7 and FIG. 8.

The signal processing unit 30 according to the fourth embodiment uses the interference occurrence period of time in the snapshot data as the interference value. The signal processing unit 30 executes the target estimation process and the weighting coefficient calculating process, a part of which is different in those processes in the first embodiment. The processes in the fourth embodiment are a modification of the processes in the first embodiment.

The following description will be mainly given of the modification of the target estimation process and the weighting coefficient calculating process.

Figure 7:
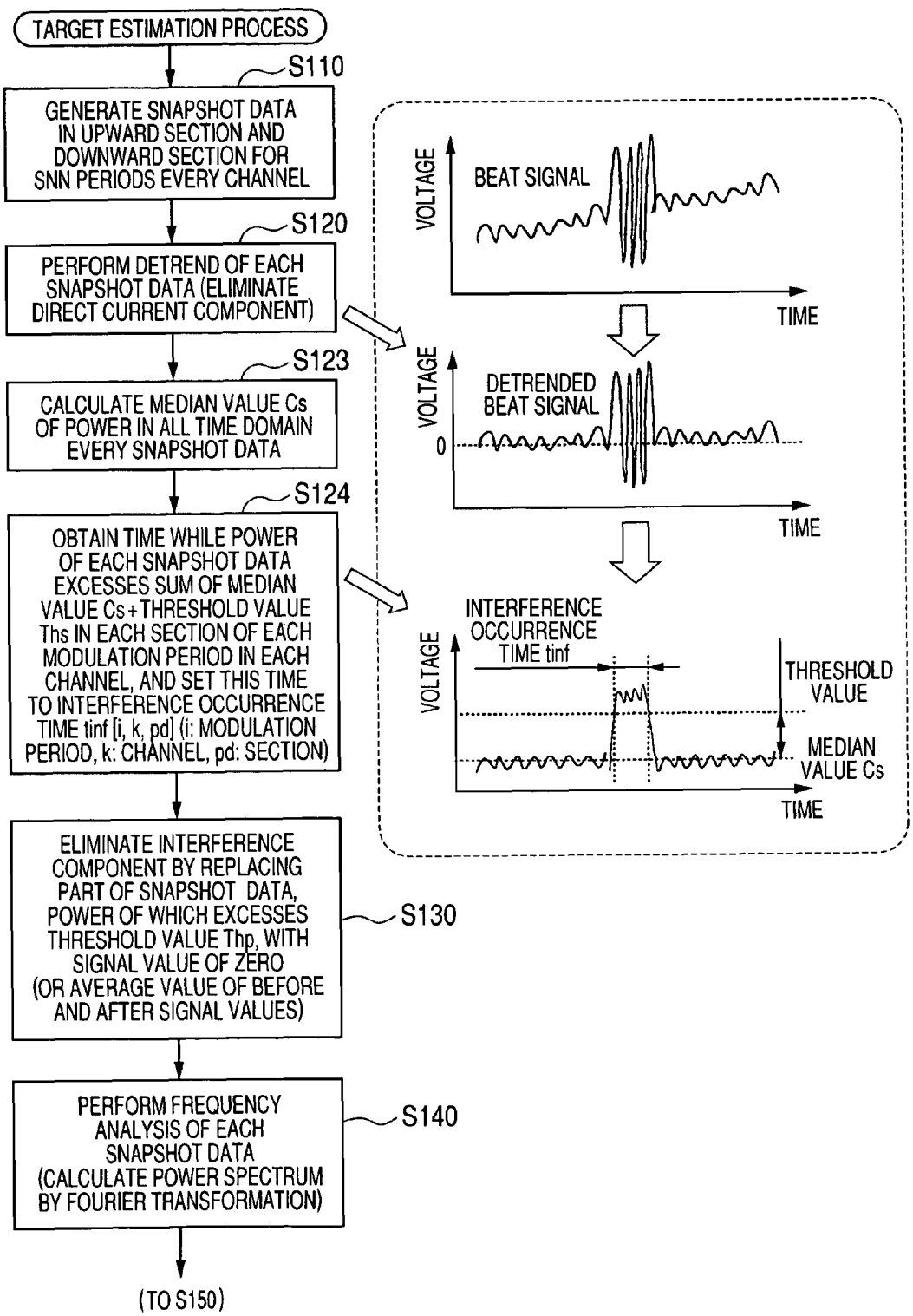
FIG. 7 is a flow chart showing a part of the target estimation process which is repeatedly executed by the signal processing unit in the radar device according to a fourth embodiment of the present invention.

FIG. 7 is a flow chart showing a part of the target estimation process which is repeatedly executed by the signal processing unit 30 in the radar device 1 according to the fourth embodiment of the present invention.

When starting the target estimation process shown in FIG. 7, the signal processing unit 30 generates the snapshot data of each of the channels, like that in the first embodiment, in each of the upward section and the downward section in the SSN periods (step S110). The signal processing unit 30 then performs the detrending process of each of the snapshot data (step S120).

After completion of those processes, the operation flow progresses to step S123. The signal processing unit 30 calculates the median value Cs of the power in the all time domain of each of the snapshot data. When the signal value indicated by the snapshot data is BT(t), the signal processing unit 30 calculates the median value Cs=median (BT$^2$(t)), where BT$^2$(t) indicates the power.

After completion of the median value calculating step S123, the signal processing unit 30 executes the following process using the median value Cs calculated in step S123 every snapshot data. That is, the signal processing unit 30 adds the predetermined threshold value Ths which is determined in advance in design work to the median value Cs obtained from the snapshot data to obtain the threshold value (Cs+Ths). The signal processing unit 30 then calculates the period of time "tn" in which the power BT$^2$(t) excesses the threshold value (Cs+Ths) (step S124).

When there are a plurality of periods in the snapshot data, in which the power BT$^2$(t) exceeds the threshold value (or the judging value) (Cs+Ths), it is possible to set the maximum period of time in the plurality of periods to the period of time "tn".

The signal processing unit 30 sets the time "tn" to the interference occurrence time tinf [i, k, pd]. The interference occurrence time tinf [i, k, pd] represents the interference occurrence time of the snapshot data in the pd section in the i-th modulation period in the k-th channel. The value "pd" takes 0 or 1, which designates the upward section or the downward section.

That is, the signal processing unit 30 sets the time "tn" calculated by the above procedure based on the snapshot data of the "pd" section in the i-th modulation period in the k-th channel to the interference occurrence time tinf [i, k, pd].

After completion of the process in step S124, the signal processing unit 30 executes the processes from step S130 to step S320 shown in FIG. 2. In particular, the signal processing unit 30 executes the weighting coefficient calculating process S160-3 shown in FIG. 8 in step S160 shown FIG. 2.

Figure 8:
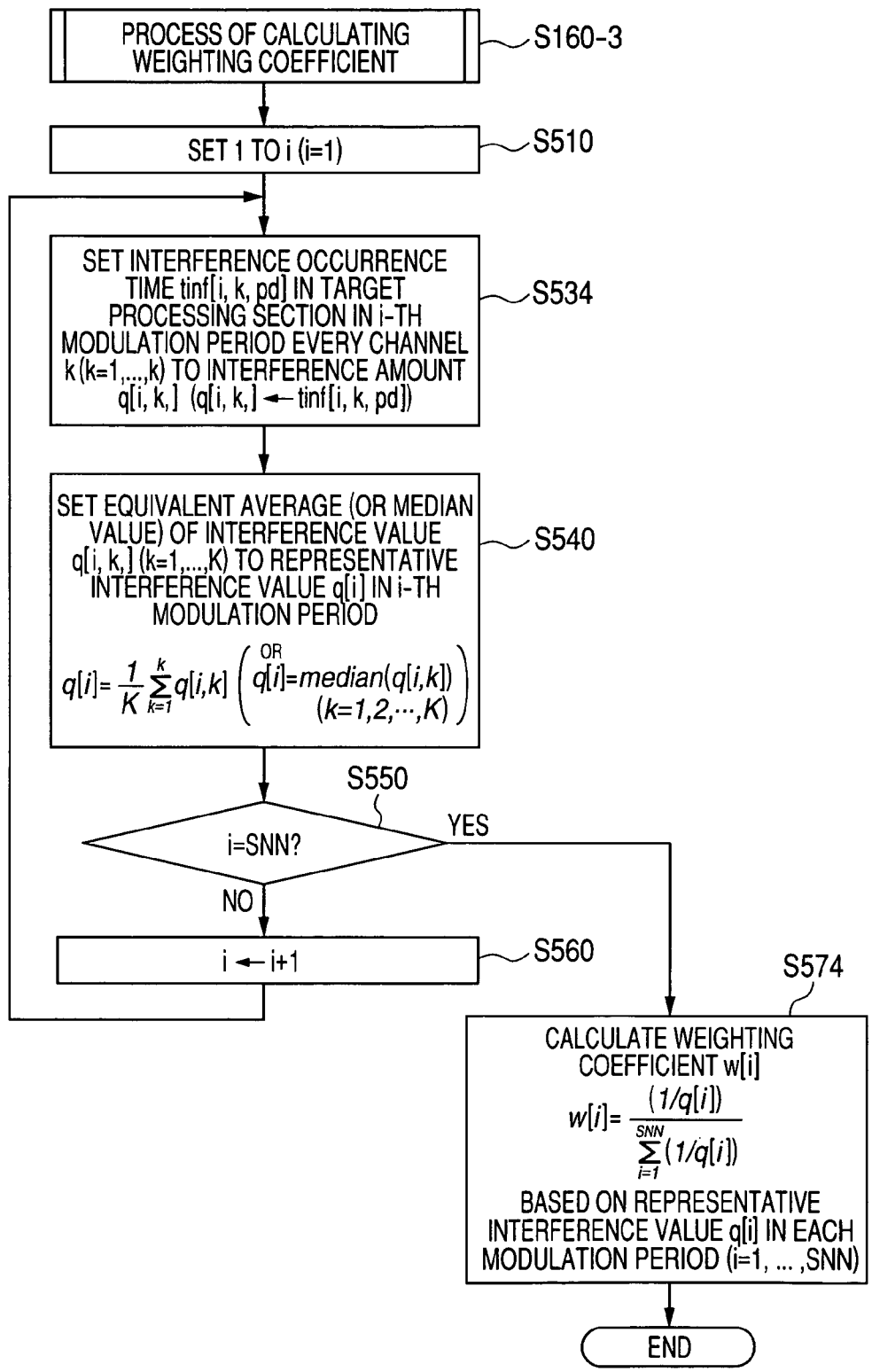
FIG. 8 is a flow chart showing the process of calculating the weighting coefficient performed by the signal processing unit in the radar device according to the fourth embodiment of the present invention.
Figure 11A:
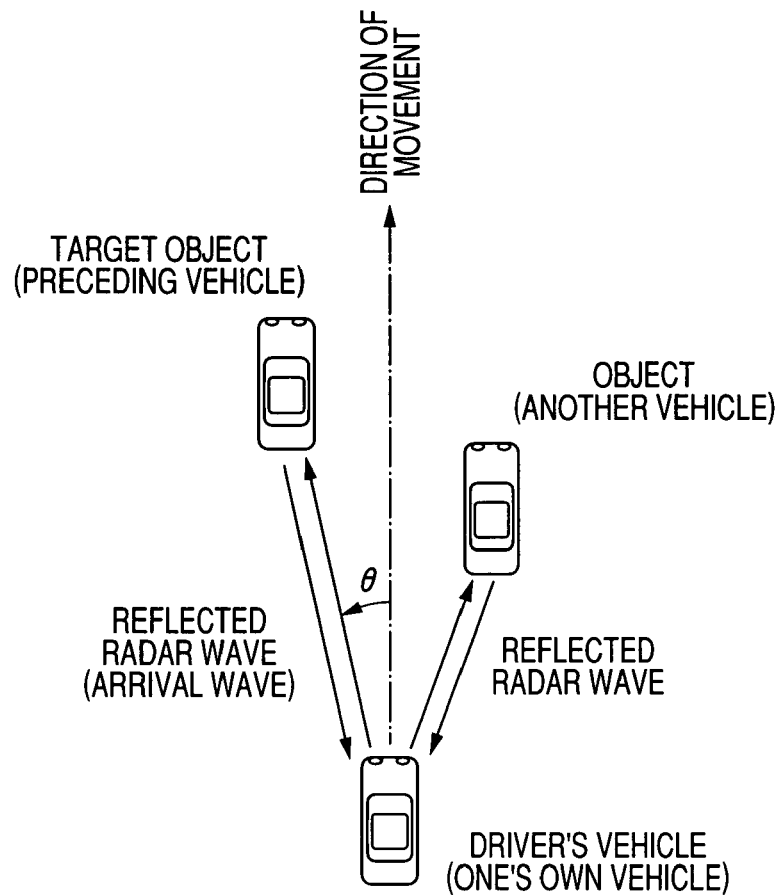
FIG. 11A and FIG. 11B are diagrams showing the estimation of the azimuth of the target vehicle.
Figure 11B:
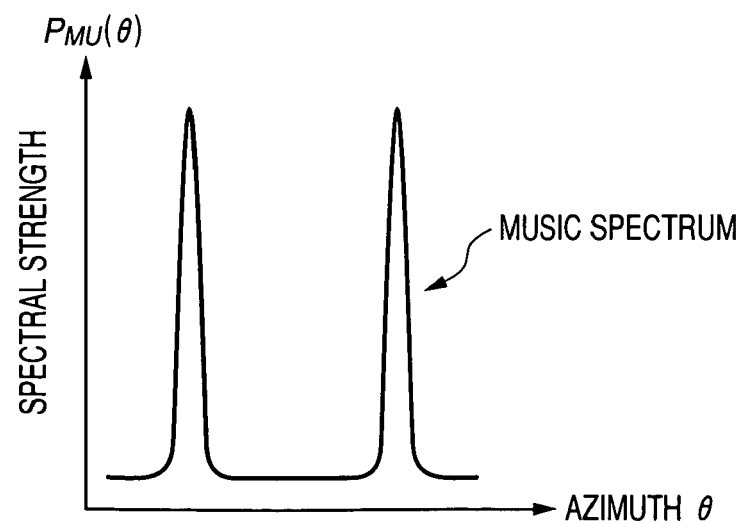
Figure 12A:
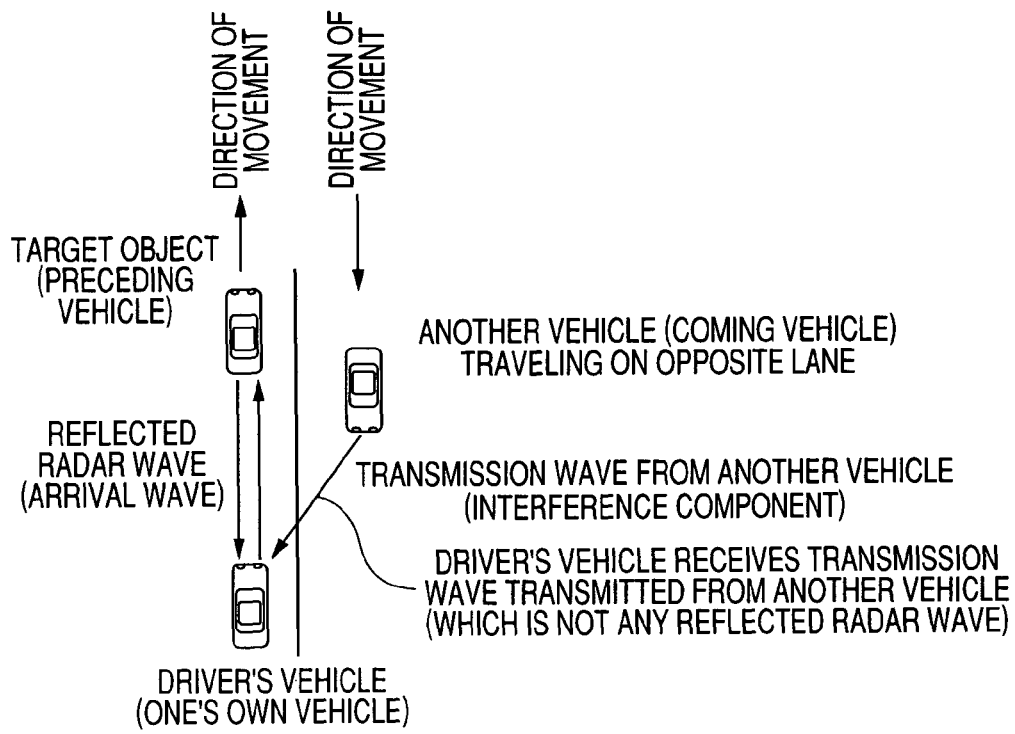
FIG. 12A and FIG. 12B are diagram showing the mechanism of generating noise.
Figure 12B:
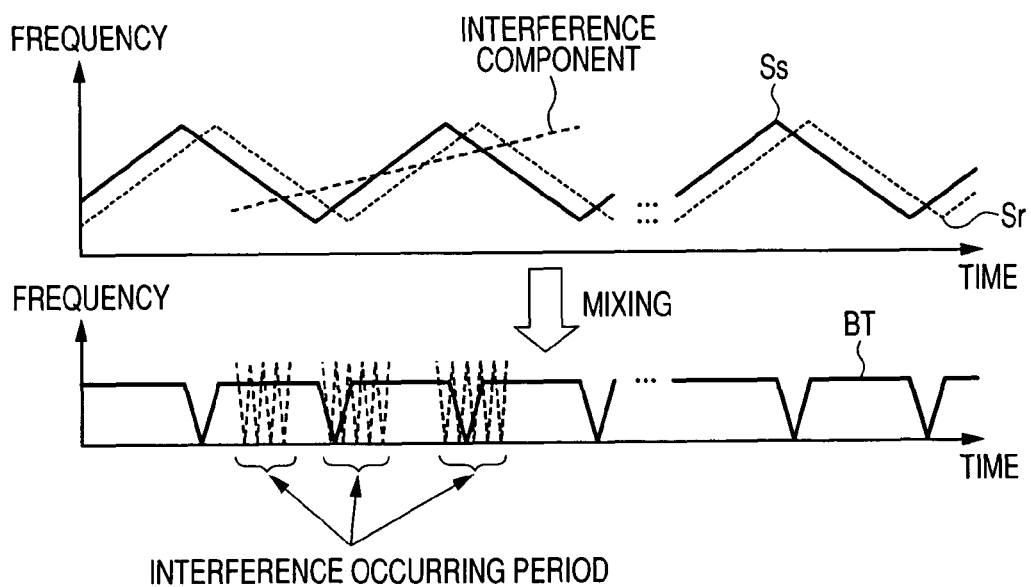

FIG. 8 is a flow chart showing the process of calculating the weighting coefficient performed by the signal processing unit 30 in the radar device 1 according to the fourth embodiment of the present invention.

When starting the weighting coefficient calculating process in step S160-3 shown in FIG. 8, the signal processing unit 30 sets the value of 1 to the variable i (step S510)

The operation flow progresses to step S534. In step S534, the signal processing unit 30 sets the interference occurrence time tinf [i,k,pd] in the target processing section (the "pd" section, namely, the upward section or the downward section) in the i-th modulation period in each of the channels to the interference value q[i,k] of the i-th modulation period in each of the channels (q[i, k] is rewritten with tinf [i,k,pd], or tinf [i,k,pd] - - - >q[i, k]).

After completion of the process in step S534, the operation flow progresses to step S540. In step S540, the signal processing unit 30 sets the representative interference value q[i] of the i-th modulation period according to the equation (12) or (13) using the interference value q[i, k] obtained in step S534.

After completion of the process in step S540, the operation flow progresses to step S550. In step S550, the signal processing unit 30 detects whether or not the variable "i" is SNN (i=SNN). When the judgment result in step S550 indicates that the variable "i" is not the same as SNN ("No" in step S550), the operation flow progresses to step S560. In step S560, the variable "i" is incremented by one (i is rewritten with i+1, or i=i+1), the operation flow is returned to step S534. The signal processing unit 30 calculates the representative interference values q[1] to q[SNN] in each of the modulation periods from the first modulation period to the SNN-th modulation period.

On the other hand, when the detection result in step S550 indicates that the variable "i" is just the same as SNN (i=SNN, "Yes" in S550), the operation flow progresses to step S574. In step S574, the signal processing unit 30 calculates the weighting coefficients w[i] (i=1, . . . , SNN), to be used for the weighting average process of the target processing section in the current target estimation cycle, according to the equation (14) based on the representative interference values q[1] to q[SNN] of the target processing section in each of the modulation periods from the first modulation period to the SNN-th modulation period.

After completion of the process in step S574, the signal processing unit 30 completes the weighting coefficient calculation process.

According to the fourth embodiment of the present invention, the interference occurrence time tinf is used as the interference value "q", and the weighting coefficient is calculated using the interference value "q". This can correctly obtain the weighting coefficient w[i], and suppress the deterioration of the calculation accuracy of the target azimuth by noise.

In the fourth embodiment, it is possible to determine the representative channel by the process in the second embodiment, or to replace the processes in step S534 and S540 so that the interference occurrence time tinf [i, k0, pd] in the target processing section in the i-th modulation period in the representative channel.

The mixed noise amount estimation means in the claims corresponds to the processes in step S123, S123, S534, and S540 executed by the signal processing unit 30.

Fifth Embodiment

A description will be given of the radar device according to the fourth embodiment of the present invention with reference to FIG. 9A and FIG. 9B.

The signal processing unit 30 according to the fifth embodiment uses the average value of the power in all time domains (or all time periods) in the snapshot data as the interference value. Therefore the signal processing unit 30 executes the target estimation process and the weighting coefficient calculating process, a part of which is different in those processes in the first embodiment. The processes in the fifth embodiment are a modification of the processes in the first embodiment.

The following description will be mainly given of the modification of the target estimation process and the weighting coefficient calculating process.

FIG. 9A is a flow chart showing another target estimation process which is repeatedly executed by the signal processing unit 30 in the radar device 1 according to fifth embodiment of the present invention.

When starting the process shown in FIG. 9A, the signal processing unit 30 obtains the snapshot data of each of the channels in each of the upward section and the downward section for the SNN periods, like the first embodiment. The signal processing unit 30 then performs the detrend process of the obtained snapshot data (step S120).

After completion of the process in step S120, the operation flow progresses to step S125. In step S125, the signal processing unit 30 calculates the average value Ms of the power in all time domains shown in the snapshot data. That is, when the snapshot data is a time series data composed of L signal values, and the signal value in the snapshot data at the time "t" is Bt(t), the signal processing unit 30 calculates the average value Ms of the power spectrum in all time domains in the snapshot data by the following equation (26).

$$Ms = \frac{1}{L}\sum_{t} BT^2(t). \tag{26}$$

In the following explanation, the average value Ms obtained based on the snapshot data in the "pd" section og the i-th modulation period in the k-th channel is expressed by the power average value Ms [i, k, pd] in all time domains or all time periods.

After completion of calculating the power average value Ms[i, k, pd], the signal processing unit 30 executes the processes of the steps S130, S140, and others. In the fifth embodiment, the signal processing unit 30 executes another weighting coefficient calculation process shown in step S160-4.

FIG. 9B is a flow chart showing the process S160-4 of calculating the weighting coefficient performed by the signal processing unit 30 in the radar device 1 according to fifth embodiment of the present invention.

When starting the weighting coefficient calculating process shown in FIG. 9B, the signal processing unit 30 sets the value of 1 to the variable "i" (i=1, step S510). The operation flow progresses to step S535. In step S535, the signal processing unit 30 sets the power average value Ms[i, k, pd] in the target processing section ("pd" section such as the upward section and the downward section) in the i-th modulation period for the target channel to the interference value q[i, k] in the i-th modulation period in the target channel (Ms[i, k, pd] - - - >q[i, k]).

The signal processing unit 30 sets the representative interference value q[i] of the i-th modulation period according to the equation (12) or the equation (13) using the interference value q[i, k] obtained in step S535. The signal processing unit 30 executes those processes from i=1 to i=SNN in order to calculate the representative interference values q[1] to q[SNN] in the target section in each of the modulation periods from the first to the SNN-th modulation periods.

After this, the signal processing unit 30 calculates the weighting coefficients w[i], to be used for calculating the weighted average in the target processing section in the current target estimation cycle, based on the calculated representative interference values q[1] to q[SNN] in each of the modulation periods from the first to the SNN-th modulation periods according to the equation (14).

When the representative value q[i] is a decibel value, the signal processing unit 30 calculates the weighting coefficients w[i] according to the equation (16) (step S570). After this, the signal processing unit 30 completes the weighting coefficient calculation process.

According to the fifth embodiment described above, it is possible to effectively calculate the weighting coefficient w[i] even if the power average value Ms is used as the interference value q in order to calculate the weighting coefficient w[i].

Like the second embodiment, it is possible for the signal processing unit 30 according to the fifth embodiment to determine the representative channel. It is possible to replace the processes in steps S535 and S540 with the processes in which the power average value Ms[i, k0, pd] in the target processing section in the i-th modulation period of the representative channel is set to the representative interference value q[i] in the i-th modulation period.

The mixed noise amount estimation means in claims corresponds to the processes in step S125, S535, and S540 executed by the signal processing unit 30.

The concept of the present invention is not limited by the first to fifth embodiments previously described in detail. It is possible to make various modifications.

For example, the section average power spectrum $P_k(\omega)$ is calculated based on the power spectrum $P_{ik}(\omega)$ of the target channel in each of the modulation periods from the first to the SNN-th modulation period in each of the channels. The equivalent average of the section average power spectrum $P_k(\omega)$ (k=1, ..., K) in each of the channels is obtained in order to calculate the representative power spectrum $P(\omega)$.

However, the representative power spectrum $P(\omega)$ can be also obtained by the following processes.

That is, the equivalent average of the power spectrum $P_{ik}(\omega)$ from the first to the K-th channels in each of the modulation periods is obtained in order to calculate the power spectrum $P_i(\omega)$ every modulation period by the following equation (27).

$$P_i(\omega) = \frac{1}{K} \sum_{k=1}^{K} P_{ik}(\omega). \tag{27}$$

It is also possible to calculate the representative power spectrum $P_i(\omega)$ by performing the weighting average process according to the following equation (28) using the weighting coefficient w[i].

$$P(\omega) = \sum_{i=1}^{SNN} w[i] P_i(\omega). \tag{28}$$

In this case, the peak frequency $\omega_n$ (n=1, ..., N) is obtained based on the representative power spectrum $P(\omega)$ calculated using the equation (28).

It is also acceptable to eliminate the process in step S130 in the first to fifth embodiments. In this case, the influence of noise increases, this case can decrease the calculation load of the signal processing unit 30.

Further, it is possible to use an array antennal composed of antennal elements which are placed at a different interval instead of the array antenna composed of the antenna elements placed at a constant interval.

Still further, the first to fifth embodiments describe the radar device 1 which receives the signals transferred from the antenna elements, each of which is switched by the receiving switch 21. However, the present invention is not limited by this. It is possible to apply the radar device according to the present invention to another type of the radar device capable of simultaneously receiving the signals from each of the antenna elements.

Other Features and Effects of the Present Invention

It is possible to apply the concept of the radar device according to the present invention to FMCW type radar devices. That is, the transmitting and receiving means is configured to transmit the radar wave according to a frequency modulated transmission signal, and mix the received signals through the antenna elements forming the array antenna and the transmission signals together in order to generate a beat signal derived from the received signals and the transmission signals. In this structure, the data collecting means is configured to obtain the sample of the beat signal transferred from the transmitting and receiving means in order to generate the unit data.

When the concept of the present invention is applied to a FMCW type radar device, it is possible to have the data collecting means configured to generate the unit data every a modulation period (1/fm) of the transmission signal. The radar device as another aspect of the present invention further comprises a conversion means and a frequency estimating means. The conversion means is configured to convert the sample of each of the antenna elements, which forms the unit data, to a frequency domain (or a frequency period) from a time domain in order to generate frequency range data of each of the antenna elements. The frequency estimating means is configured to estimate a reflected radar wave frequency as a frequency of the reflected radar wave based on the frequency range data of at least one of the antenna elements which is determined in advance in the array antenna. In addition, the auto-correlation matrix generating means is configured to generate an auto-correlation matrix of a received vector in which the frequency range data of each of the antenna elements, generated based on each of the unit data, at the reflected radar wave frequency estimated by the frequency estimating means are arranged as vector elements. The frequency estimating means is configured to estimate the reflected radar wave frequency to be used when the auto-correlation matrix is generated every group of the predetermined number of the auto-correlation matrices to be used when the section average correlation matrix generating means calculates the average.

There are various known methods to convert the time domain to the frequency domain, for example, Fourier transformation (such as a discrete Fourier transformation (DFT) and a fast Fourier transformation (FFT)) and a discrete cosine transformation (DCT).

In the radar device as another aspect of the present invention, the conversion means is configured to perform Fourier transformation to convert the sample of each of the antenna elements from time domain to frequency domain.

In addition, the frequency estimating means comprises an averaging means. This averaging means is configured to generate section average frequency range data as the frequency range data after completion of performing the time average every target antenna element by executing the time average of the predetermined number of frequency range data, every target antenna element, in the frequency range data to be used for generating the predetermined number of the auto-correlation matrices as the target in the average calculation of the section average correlation matrix generating means. That is, it is possible for the frequency estimating means to be configured to estimate the reflected radar wave frequency to be used for generating the auto-correlation matrices based on the section average frequency range data of each of the target antenna elements. The section average frequency range data of each of the target antenna elements is generated by the averaging means every group of the predetermined number of the auto-correlation matrices as the target of the average calculation by the section average correlation matrix generating means.

Further, it is possible for the averaging means to have the structure for generating the section average frequency range data every target antenna element. That is, the averaging means is configured to generate, as the section average frequency range data, frequency range data as the weighted average of the predetermined number of the frequency range data using the corresponding weighting coefficients every target antenna element by applying the weighting coefficients to each of the predetermined number of the frequency range data. The weighting coefficients are determined by the coefficient determining means and to be applied to the auto-correlation matrices generated based on each of the predetermined number of the frequency range data.

By the way, the conventional radar device generates the section average frequency range data by performing the equivalent average of the predetermined number of the frequency range data, and then estimates the reflected radar wave frequency based on this section average frequency range data.

Because of this, it is difficult for the conventional radar device to calculate the azimuth of the target object with high accuracy when noise is locally added on the sample.

On the other hand, according to the radar device of the present invention, because the influence of locally added noise onto the sample can be decreased by using the weighted average as small as possible, it is possible to estimate the reflected radar wave frequency with high accuracy, and as a result, to calculate the azimuth of the target object with high accuracy.

In the radar device as another aspect of the present invention the frequency estimating means can be configured to estimate the reflected radar wave frequency based on the frequency range data obtained by performing an equivalent average of the section average frequency range data obtained by performing the weighting average every target antenna element.

The radar device can have the configuration to generate the target frequency range data, to be used for the estimation of the reflected radar wave frequency, by performing the equivalent average of the section average frequency range data which is obtained by performing the weighted average of the frequency range data in time, previously described. The radar device can also have another configuration to generate the target frequency data, to be used for the estimation of the reflected radar wave frequency, by using the weighted average of the representative frequency range data in time, which is obtained by performing the equivalent average of the frequency range data every antenna element.

That is, in the radar device as another aspect of the present invention, the frequency estimating means has a statistic means and an averaging means. The statistic means is configured to generate a representative frequency range data every unit data by statistically processing the frequency range data corresponding to each of the target antenna elements obtained from the unit data. The averaging means is configured to generate the section average frequency range data, as the frequency range data after the time average, by performing the time average of the predetermined number of the representative frequency range data generated by the above statistic means corresponding to each of the unit data, to be used for generating the predetermined number of the auto-correlation matrices as the target on performing the average calculation by the section average correlation matrix generating means. In particular, the frequency estimating means estimates the reflected radar wave frequency, to be applied when the auto-correlation matrix is generated, based on the section average frequency range data generated by the average means every group of the predetermined number of the auto-correlation matrices as the target of the average calculation by the section average correlation matrix generating means. In addition, the averaging means is configured to generate, as the section average frequency range data, the frequency range data obtained by the weighting average of the predetermined number of the representative frequency range data, as the target of the average calculation, with the weighting coefficients, to be applied to the auto-correlation matrix generated by the unit data corresponding to the predetermined number of the representative frequency range data.

In the radar device according to the present invention, the statistic means is configured to generate, as the representative frequency range data, the frequency range data obtained by the equivalent average of the frequency range data obtained from each of the target antenna elements.

In addition, the mixed noise amount estimating means is configured to calculate, as a noise analyzed value every unit data, a median value or an average value of the power in the high frequency range in the sample of the target antenna element, which is determined in advance for one or more target antenna elements for noise analysis in the antenna elements forming the array antenna. The mixed noise amount estimating means then estimates the amount of noise mixed into the unit data using the noise analyzed value of each target antenna element.

Thus, it is possible for the radar device according to the present invention to calculate the target azimuth with high accuracy by performing the weighted average of the auto-correlation matrices after estimating the amount of mixed noise from the power in the high frequency range.

In the radar device as another aspect of the present invention, instead of using the median value or the average value of the power in the high frequency range in the sample of the target antenna element for noise analysis, it is possible for the mixed noise amount estimating means to estimate the amount of noise mixed into each unit data based on the average value, as the noise analyzed value, of the power in all time domains (or all time periods) of the sample of each of one or more the predetermined number of the target antenna elements forming the array antenna.

Instead of using the median value or the average value of the power in the high frequency range in the sample, it is also possible that the mixed noise amount estimating means is configured to estimate the amount of noise mixed in the unit data using a time length, as the noise analyzed value, in the time domain in which the power of the sample of the target antenna element in noise analysis is not less than a threshold value.

As described above, it is possible to calculate the target azimuth with high accuracy by estimating the mixed noise amount in the unit data based on the average value of the power in all time domains or the time length in which the power is not less than the predetermined value, and by performing the weighting average of the auto-correlation matrices.

In the radar device as another aspect of the present invention, it is possible for the mixed noise amount estimating means to estimate, as a mixed noise amount of the unit data, an equivalent average value or a median value of the noise analyzed values determined for each of the target antennal elements.

In the radar device as another aspect of the present invention, it is possible for the mixed noise amount estimating means to estimate, as the amount if noise mixed into the unit data, a noise analyzed value obtained for the target antenna element.

On the other hand, in the radar device as another aspect of the present invention, it is possible for the coefficient determining means to calculate a ratio $((1/q[i])/\{(1/q[1])+ \ldots +(1/q[N])\}$ as the weighting coefficient $w[i]$, where $w[i]$ is a weighting coefficient to be applied to the i-th auto-correlation matrix element $Rxx [i]$ $(i=1, \ldots, N))$, namely, the weighting coefficient $w[i]$ is applied to each of the auto-correlation matrices from the first auto-correlation matrix element $Rxx [1]$ to the N-th auto correlation matrix $Rxx [N]$ as the predetermined number of the target auto-correlation matrices to be used for the average calculation by the section average correlation matrix generating means, $(1/q[i])$ is an inverse value of the mixed noise amount of the unit data estimated by the mixed noise amount estimating means, and the value of $\{(1/q[1])+ \ldots +(1/q[N])\}$ is a total sum of the inverse values $(1/q[i])$ of the mixed noise amount corresponding to each of the first auto-correlation matrix $Rxx [1]$ to the N-th auto-correlation matrix $Rxx [N]$.

It is thereby possible to obtain the section average correlation matrix by effectively weighting the auto-correlation matrix using the above weighting coefficient $w[i]$ according to the amount of mixed noise.

In the radar device as another aspect of the present invention, it is possible for the coefficient determining means to compare the mixed noise amount of the unit data, to be used when each of the auto-correlation matrices is generated, estimated by the mixed noise amount estimating means with a predetermined threshold value. The coefficient determining means then sets the weighting coefficient to be applied to the auto-correlation matrix, the mixed noise amount of which is less than a predetermined threshold value, to a predetermined first value. The coefficient determining means finally sets the weighting coefficient to be applied to the auto-correlation matrix, the mixed noise amount of which is not less than the predetermined threshold value, to a predetermined second value that is smaller than the predetermined first value.

Using the above procedure can determine the weighting coefficient $w[i]$ by a simple calculation. This decreases or suppresses the processing load of the radar device. In the above structure of the coefficient determining means, it is possible to use the predetermined second value of more than zero, or zero. That is, it is possible not to use the auto-correlation matrix with the mixed noise amount of not less than the predetermined threshold value in the calculation of the section average correlation matrix. Still further, when the weighting coefficient $w[i]$ is determined, it is possible to normalize the sum of the weighting coefficients to one according to demand.

In the radar device as another aspect of the present invention, it is possible that the target azimuth calculating means is comprised of a smoothed correlation matrix generating means. This smoothed correlation matrix generating means is configured to adjust the latest section correlation matrix by smoothing the previous section average correlation matrix generated by the section average correlation matrix generating means every generating cycle of the section average correlation matrix in order to generate a smoothed correlation matrix. The target azimuth calculating means is configured to calculate the target azimuth of the target object by which the transmission radar wave is reflected based on the smoothed correlation matrix every generation of the section average correlation matrix.

Calculating the target azimuth by the above procedure can improve and increase the accuracy in calculation of the target azimuth. The known radar device does not continuously transmit radar waves, and intermittently transmits radar waves. When considering the deterioration of the calculation accuracy caused by the interference of the radar waves between the driver's vehicle and another vehicle, it can be understood that interference does not always occur. From this viewpoint, it is possible to calculate the target azimuth with high accuracy while suppressing or avoiding the influence of the section having a large amount of noise when the latest section correlation matrix is adjusted by smoothing it using the previous section correlation matrix.

It is also possible for the smoothed correlation matrix generating means to be configured to adjust the latest section average correlation matrix $R1$, generated every cycle of generating the section average correlation matrix by the section average correlation matrix generating means, based on the previous correlation matrix $R2pre$ generated in the previous cycle and a predetermined forgetting factor $\beta$, and generate a smoothed correlation matrix $R2$ in a current cycle using Equation $R2=\beta \cdot R2pre+(1-\beta) \cdot R1 \ldots (10)$ by smoothing the latest section average correlation matrix $R1$ using the previous section average correlation matrix generated by the section correlation matrix generating means.

In the radar device as another aspect of the present invention, it is preferable for the target azimuth calculating means to have an adaptive judgment means configured to judge whether or not the latest section average correlation matrix, generated by the section average correlation matrix generating means, is used in the generation of the smoothed correlation matrix based on the amount of noise mixed in the unit data, generated by the mixed noise amount estimating means, corresponding to each of the predetermined number of the section average correlation matrices to be used when the section average correlation matrix is generated every generation cycle of the section average correlation matrix.

That is, the smoothed correlation matrix generating means is configured to adjust the latest section average correlation matrix using the previous section average correlation matrix generated in the previous cycle, and use the adjusted section average correlation matrix as the smoothed correlation matrix in the current cycle when the adaptive judgment means allows the use of the latest section average correlation matrix, in order that the latest section average correlation matrix is smoothed using the previous section correlation matrix generated by the section average correlation matrix generating means. Further, the smoothed correlation matrix generating means is configured to generate the smoothed correlation matrix in the current cycle only using the previous smoothed correlation matrix generated in the previous cycle without using the latest section average correlation matrix when the adaptive judgment means denies the use of the latest section average correlation matrix.

The radar device having the above structure can avoid the calculation of determining an error target azimuth because of not using the section correlation matrix generated when the amount of mixed noise is extremely large.

Specifically, the smoothed correlation matrix generating means is configured to generate the smoothed correlation matrix R2 of the current cycle using Equation R2=β·R2pre+ (1−β)·R1 . . . (10) when the adaptive judgment means allows the use of the latest section average correlation matrix. On the other hand, when the adaptive judgment means denies the use of the latest section average correlation matrix, the smoothed correlation matrix generating means uses the previous section average correlation matrix generated in the previous cycle as the smoothed correlation matrix R2 of the current cycle without using the latest section average correlation matrix R1.

It is also possible for the adaptive judgment means to calculate a weighted average of the amount of noise mixed into the unit data by applying a weighting coefficient, which is the same as the weighting coefficient (to be applied to the auto-correlation matrix) determined by the coefficient determining means, to the amount of noise mixed into the unit data corresponding to each of the predetermined number of the auto-correlation matrices used on generating the latest section correlation matrix. The adaptive judgment means allows the use of the latest section average correlation matrix for generating the smoothed correlation matrix when the calculated weighted average is not more than a predetermined threshold value, and on the other hand, denies the use of the latest section average correlation matrix for generating the smoothed correlation matrix when the calculated weighted average is more than the predetermined threshold value.

As described above, the adaptive judgment means having the above configuration and function can avoid using the section average correlation matrix generated when a large amount of noise is entered to the unit data, and correctly avoid causing an error to estimate a wrong azimuth of the target object.

The techniques of the radar device having the above structure and functions, capable of calculating the weighted average of the frequency section data, and estimating the frequency of the reflected radar wave based on the weighted average, can be applied to a radar device capable of calculating a target position and traveling speed of the target object. In other words, the concept of the radar device capable of estimating the target azimuth of the target vehicle described above can be applied to the radar device capable of calculating the target position and traveling speed of the target object based on the power spectrum obtained by frequency analysis using the equations (1) to (4).

In the radar device capable of obtaining the target information of the target object based on received signals received by an antenna as another aspect of the present invention, it is possible for the transmitting and receiving means to transmit a radar wave according to a frequency-modulated transmission signal, and mix the received signal obtained through the antenna with the transmission signal in order to generate a beat signal derived from the received signal and the beat signal. The data collecting means obtains a sample of the beat signal transferred from the transmitting and receiving means.

Further, it is possible for the target information calculating means to estimate a reflected radar wave frequency as a frequency of a reflected wave component, and obtain at least one of a target position and a traveling speed of the target object as the target information based on the estimated reflected radar waver frequency.

The radar device according to claim 21, wherein the conversion means is configure to perform Fourier transformation of the sample from time domain to frequency domain.

It is also possible for the conversion means to be configured to perform Fourier transformation of the sample from time domain to frequency domain.

Still further, it is possible for the mixed noise amount estimating means to calculate a median value or an average value of the power in a predetermined high frequency range every sample, and estimate the calculated median value or average value as the amount of mixed noise.

Thus, estimating the amount of mixed noise from the power in the high frequency range and performing the weighing average of the frequency range data make it possible to calculate the target information with high accuracy while suppressing the influence of noise.

In addition, it is acceptable for the mixed noise amount estimating means to calculate an average value of the power in all time domains of each sample instead of using the median value or the average value of the power in the high frequency range of the sample, and estimate the calculated average value as the noise mixed value.

Furthermore, it is also possible for the mixed noise amount estimating means to calculate a time length of the sample when the power of the sample is not less than the predetermined threshold value every sample, and set this calculated time length to the mixed noise amount.

Thus, it is possible to calculate the target information of the target object with high accuracy while suppressing the influence of noise by estimating the amount of mixed noise based on the average value of the power in all of the time domain or the time length of the power of not less than the predetermined threshold value, and then performing the weighting average of the frequency range data.

In the radar device as another aspect of the present invention, it is possible for the coefficient determining means to determine a ratio $((1/q[i])/\{(1/q[1])+ \ldots +(1/q[N])\}$ as the weighting coefficient $w[i]$, where this $w[i]$ is a weighting coefficient to be applied to the i-th frequency range data $F[i]$ ($i=1, \ldots, N$)), namely, the weighting coefficient $w[i]$ is applied to each of the frequency range data from the first frequency range data $F[1]$ to the N-th frequency range data $F[N]$ as the predetermined number of the target frequency range data to be used for the average calculation by the average means, the value $(1/q[i])$ is an inverse value of the mixed noise amount of the sample estimated by the mixed noise amount estimating means, and the value of $\{(1/q[1])+ \ldots +(1/q[N])\}$ is a total sum of the inverse values $(1/q[i])$ of the mixed noise amount corresponding to each of the first frequency range data $F[1]$ to the N-th frequency range data $F[N]$.

Thus, determining the weighting coefficient $w[i]$ by the above procedure can calculate the section average frequency range data by effectively weighting the frequency range data according to the mixed noise amount.

In the radar device according to the present invention described above, it is possible for the coefficient determining means to compare the amount of noise mixed to the sample estimated by the mixed noise amount estimating means with a predetermined threshold value every each of the predetermined number of the frequency range data, to be used for the average calculation by the averaging means, where the sample is data before the conversion to the frequency range data. The coefficient determining means sets to a predetermined first value the weighting coefficient to be applied to the frequency range data, the amount of mixed noise of which is less than the predetermined threshold value. The coefficient determining means further sets to a predetermined second value the weighting coefficient to be applied to the frequency range data, the mixed noise amount of which is not less than the predetermined threshold value. In particular, the predetermined second value is smaller than the predetermined first value.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not to limit the scope of the present invention which is to be given the full breadth of the following claims and all equivalents thereof.

What is claimed is:

1. A radar device capable of determining an azimuth of a target object based on received signals corresponding to reflected radar waves reflected by the target object, comprising:
    transmitting and receiving means configured to transmit radar waves, and then receive reflected radar waves reflected by the target object through an array antenna composed of antenna elements, and generate and transfer received signals corresponding to the reflected radar waves;
    data collecting means configured to repeatedly perform:
       receiving the received signals transferred from the transmitting and receiving means;
       obtaining samples corresponding to the received signals; and
       generating unit data as a set of the samples of each of the antenna elements;
    auto-correlation matrix generating means configured to generate an auto-correlation matrix based on each unit data;
    section average correlation matrix generating means configured to execute a process of calculating an average in time of a predetermined number of the auto-correlation matrix of each unit data generated by the auto-correlation matrix generating means, and generate a section average correlation matrix as an auto-correlation matrix after the time average process;
    target azimuth calculating means configured to calculate an azimuth of the target object based on the section average correlation matrices generated by the section average correlation matrix generating means;
    mixed noise amount estimating means configured to estimate an amount of noise mixed in each unit data; and
    coefficient determining means configured to determine a weighting coefficient to be applied to each of the predetermined number of the auto-correlation matrices, which is a target of calculating the average performed by the section average correlation matrix generating means, based on the amount of noise mixed in the unit data estimated by the mixed noise amount estimating means,
    wherein the section average correlation matrix generating means applies the weighting coefficients determined by the coefficient determining means to each of the predetermined number of the auto-correlation matrices, and generates an auto-correlation matrix by performing the weighting average of the predetermined number of the auto-correlation matrices using the weighting coefficients obtained by the coefficient determining means.

2. The radar device according to claim 1, wherein the transmitting and receiving means is configured to transmit the radar wave according to a frequency modulated transmission signal, and mix the received signals through the antenna elements forming the array antenna and the transmission signals together in order to generate a beat signal derived from the received signals and the transmission signals, and
    the data collecting means is configured to obtain the samples of the beat signal transferred from the transmitting and receiving means in order to generated the unit data.

3. The radar device according to claim 1, further comprising:
    conversion means configured to convert the samples of each of the antenna elements, which forms the unit data, to a frequency domain from a time domain in order to generate frequency range data of each of the antenna elements; and
    frequency estimating means configured to estimate a reflected radar wave frequency as a frequency of the reflected radar wave based on the frequency range data of at least one of the antenna elements which is determined in advance in the array antenna,
    wherein the auto-correlation matrix generating means is configured to generate an auto-correlation matrix of a received vector in which the frequency range data of each of the antenna elements, generated based on each of the unit data, at the reflected radar wave frequency estimated by the frequency estimating means are arranged as vector elements,
    and
    the frequency estimating means is configured to estimate the reflected radar wave frequency to be used when the auto-correlation matrix is generated every group of the predetermined number of the auto-correlation matrices to be used when the section average correlation matrix generating means performs the weighting average.

4. The radar device according to claim 3, wherein the conversion means is configured to perform Fourier transform to convert the samples of each of the antenna elements from a time domain to a frequency domain.

5. The radar device according to claim 3, wherein the frequency estimating means comprises averaging means configured to section average frequency range data as the frequency range data after completion of performing the time average every target antenna element by executing the time average of the predetermined number of frequency range data, every target antenna element, in the frequency range data to be used for generating the predetermined number of the auto-correlation matrices as the target in the average calculation of the section average correlation matrix generating means,
    wherein the frequency estimating means is configured to estimate the reflected radar wave frequency to be used of generating the auto-correlation matrixes based on the section average frequency range data of each of the target antenna elements generated by the averaging means every group of the predetermined number of the auto-correlation matrices as the target of the average calculation of the section average correlation matrix generating means, and
    the averaging means is configured to generate, as the section average frequency range data, frequency range data as a weighted average of the predetermined number of the frequency range data using the corresponding weighting coefficients every target antenna element by applying the weighting coefficients to each of the predetermined number of the frequency range data, where the weighting coefficients are determined by the coefficient determining means and to be applied to the auto-correlation matrices generated based on each of the predetermined number of the frequency range data.

6. The radar device according to claim 5, wherein the frequency estimating means is configured to estimate the reflected radar wave frequency based on the frequency range data obtained by performing an equivalent average of the section average frequency range data obtained from each of the target antenna elements.

7. The radar device according to claim 3, wherein the frequency estimating means comprises;
statistic means configured to generate representative frequency range data every unit data by statistically processing the frequency range data corresponding to each of the target antenna elements obtained from the unit data; and
averaging means configured to generate the section average frequency range data, as the frequency range data after the time average, by performing the time average of the predetermined number of the representative frequency range data generated by the statistic means corresponding to each of the unit data, to be used for generating the predetermined number of the auto-correlation matrices as the target on performing the average calculation by the section average correlation matrix generating means,
wherein the frequency estimating means estimates the reflected radar wave frequency, to be applied when the auto-correlation matrix is generated, based on the section average frequency range data generated by the average means every group of the predetermined number of the auto-correlation matrices as the target in calculation by the section average correlation matrix generating means, and
the averaging means is configured to generate, as the section average frequency range data, the frequency range data obtained by the weighting average of the predetermined number of the representative frequency range data, as the target of the average calculation, with the weighting coefficients, to be applied to the auto-correlation matrix generated by the unit data corresponding to the predetermined number of the representative frequency range data.

8. The radar device according to claim 7, wherein the statistic means is configured to generate, as the representative frequency range data, the frequency range data obtained by equivalent average of the frequency range data obtained from each of the target antenna elements.

9. The radar device according to claim 1, wherein the mixed noise amount estimating means is configured to:
calculate, as an analyzed noise value every unit data, a median value or an average value of the power in the high frequency range in the samples of one or more antenna elements, which is determined in advance as the target antenna elements for noise analysis in the antenna elements forming the array antenna; and
estimate the amount of noise mixed into the unit data using the noise analyzed value of each unit data.

10. The radar device according to claim 1, wherein the mixed noise amount estimating means is configured to:
calculate an average value of the power in all time domains in the samples of the target antenna element, as the analyzed noise value, which is determined in advance as the target antenna elements for noise analysis in the antenna elements forming the array antenna; and
estimate the amount of noise mixed into each unit data based on the average value of each target antenna element.

11. The radar device according to claim 1, wherein the mixed noise amount estimating means is configured to:
obtain a time length of not less than a threshold value in the time domain of the sample of the target antenna element, as the analyzed noise value, which is determined in advance as the target antenna elements for noise analysis in the antenna elements forming the array antenna; and
estimate the amount of noise mixed in the unit data based on the time length of each target antenna element.

12. The radar device according to claim 9, wherein the number of the target antenna elements for noise analysis is not less than two, and the mixed noise amount estimating means is configured to estimate, as a amount of noise mixed to the unit data, an equivalent average value or a median value of the noise analyzed values determined for each of the target antennal elements.

13. The radar device according to claim 9, wherein the number of the target antenna elements for noise analysis is one, and the mixed noise amount estimating means is used as a noise analyzed value of the target antenna element as the amount of noise mixed to the unit data.

14. The radar device according to claim 1, wherein the coefficient determining means is configured to calculate a ratio $(1/q[i])/\{(1/q[1])+ \ldots +(1/q[N])\}$ as the weighting coefficient w[i], where w[i] is a weighting coefficient to be applied to the i-th auto-correlation matrix element Rxx [i] (i=1, ..., N), wherein, the weighting coefficient w[i] is applied to each of the auto-correlation matrices from the first auto-correlation matrix element Rxx [1] to the N-th auto correlation matrix element Rxx [N] as the predetermined number of the target auto-correlation matrices to be used for the average calculation by the section average correlation matrix generating means, $(1/q[i])$ is an inverse value of the amount of noise mixed to the unit data estimated by the mixed noise amount estimating means, and the value of $\{(1/q[1])+ \ldots +(1/q[N])\}$ is a total sum of the inverse values $(1/q[i])$ of the amount of mixed noise corresponding to each of the first auto-correlation matrix element Rxx [1] to the N-th auto-correlation matrix element Rxx [N].

15. The radar device according to claim 1, wherein the coefficient determining means is configured to:
compare the amount of noise mixed into the unit data, to be used when each of the auto-correlation matrices is generated, estimated by the mixed noise amount estimating means, with a predetermined threshold value,
sets the weighting coefficient to be applied to the auto-correlation matrix, the amount of mixed noise of which is less than a predetermined threshold value, to a predetermined first value, and
sets the weighting coefficient to be applied to the auto-correlation matrix, the amount of mixed noise of which is not less than the predetermined threshold value, to a predetermined second value that is smaller than the predetermined first value.

16. The radar device according to claim 1, wherein the target azimuth calculating means comprises smoothed correlation matrix generating means configured to adjust the latest section correlation matrix by smoothing the previous section average correlation matrix generated by the section average correlation matrix generating means every generating cycle of the section average correlation matrix in order to generate a smoothed correlation matrix, and
the target azimuth calculating means is configured to calculate the target azimuth of the target object by which the transmission radar wave is reflected based on the smoothed correlation matrix every generation cycle of the section average correlation matrix.

17. The radar device according to claim 16, wherein the smoothed correlation matrix generating means is configured to adjust the latest section average correlation matrix R1, generated every cycle of generating the section average correlation matrix by the section average correlation matrix generating means, based on the previous correlation matrix $R2_{pre}$ generated in the previous cycle and a predetermined forgetting factor $\beta$, and generate a smoothed correlation matrix R2 in a current cycle using Equation $R2=\beta \cdot R2_{pre}+(1-\beta)\cdot R1$ by smoothing the latest section average correlation matrix R1 using the previous section average correlation matrix generated by the section correlation matrix generating means.

18. The radar device according to claim 16, wherein the target azimuth calculating means comprises an adaptive judgment means configured to judge whether or not the latest section average correlation matrix, generated by the section average correlation matrix generating means, is used in the generation of the smoothed correlation matrix based on the amount of noise mixed in the unit data, generated by the mixed noise amount estimating means, corresponding to each of the predetermined number of the section average correlation matrices to be used when the section average correlation matrix is generated every generation cycle of the section average correlation matrix, wherein the smoothed correlation matrix generating means is configured to adjust the latest section average correlation matrix using the previous section average correlation matrix generated in the previous cycle, and use the adjusted section average correlation matrix as the smoothed correlation matrix in the current cycle when the adaptive judgment means allows the use of the latest section average correlation matrix, in order that the latest section average correlation matrix is smoothed using the previous section correlation matrix generated by the section average correlation matrix generating means, and the smoothed correlation matrix generating means is configured to generate the smoothed correlation matrix in the current cycle only using the previous smoothed correlation matrix generated in the previous cycle without using the latest section average correlation matrix when the adaptive judgment means denies the use of the latest section average correlation matrix.

19. The radar device according to claim 18, wherein the smoothed correlation matrix generating means is configured to generate the smoothed correlation matrix R2 in the current cycle using Equation $R2=\beta \cdot R2pre+(1-\beta)\cdot R1$ by adjusting the latest section average correlation matrix R1 with the smoothed correlation matrix R2pre generated in the previous cycle and the predetermined forgetting factor $\beta$ when the adaptive judgment means allows the use of the latest section average correlation matrix, in order to smooth the latest section average correlation matrix R1 using the previous section average correlation matrix, and the smoothed correlation matrix generating means is configured to determine the smoothed correlation matrix R2pre generated in the previous cycle as the smoothed correlation matrix R2 in the current cycle without using the latest section average correlation matrix R1 when the adaptive judgment means denies the use of the latest section average correlation matrix.

20. The radar device according to claim 18, wherein the adaptive judgment means calculates a weighted average of the amount of noise mixed to the unit data by applying a weighting coefficient, which is the same as the weighting coefficient determined as the weighting coefficient applied to the auto-correlation matrix by the coefficient determining means, to the amount of noise mixed to the unit data corresponding to each of the predetermined number of the auto-correlation matrices used when the latest section correlation matrix is generated, the adaptive judgment means allows the use of the latest section average correlation matrix for generating the smoothed correlation matrix when the calculated weighted average is not more than a predetermined threshold value, and denies the use of the latest section average correlation matrix for generating the smoothed correlation matrix when the calculated weighted average is more than the predetermined threshold value.

21. A radar device capable of calculating target information of a target object based on received signals corresponding to reflected radar waves reflected by the target object, comprising:

transmitting and receiving means configured to transmit a radar wave and receive a reflected radar wave reflected by the target object through an antenna, and generate and transfer received signals corresponding to the reflected radar waves;

data collecting means configured to repeatedly obtain samples of the received signals transferred from the transmitting and receiving means;

conversion means configured to convert the sample in time domain to the sample in frequency domain in order to generate frequency range data;

mixed noise amount estimating means configured to estimate an amount of noise mixed into each of the samples obtained by the data collecting means;

average means configured to generate section average frequency range data as the frequency range data after time average by performing a time average of the frequency range data corresponding to the predetermined number of samples generated by the conversion means;

target information calculating means configured to obtain the target information based on the section average frequency range data generated by the average means; and coefficient determining means configured to determine a weighting coefficient, to be applied to each of the predetermined number of the frequency range data as the target of calculating the section average frequency data by the average means, based on the amount of mixed noise estimated by the mixed noise amount estimating means, in the sample before the conversion to the frequency range data, estimated by the mixed noise amount estimating means, wherein the average means is configured to apply the weighting coefficient determined by the coefficient determining means to each of the predetermined number of the frequency range data in order to generate the frequency range data, as the section average frequency range data, obtained by performing the weighting average of the predetermined number of the frequency range data using the weighting coefficient determined by the coefficient determining means.

22. The radar device according to claim 21, wherein the transmitting and receiving means transmits a radar wave according to a transmission signal which is frequency-modulated, and mixes the received signal obtained through the antenna with the transmission signal in order to generate a beat signal derived from the received signal and the beat signal, the data collecting means obtains a sample from the beat signal transferred from the transmitting and receiving means, and the target information calculating means is configured to estimate a reflected radar wave frequency as a frequency of a reflected wave component, and obtain at least one of a target position and a traveling speed of the target object as the target information based on the estimated reflected radar waver frequency.

23. The radar device according to claim 21, wherein the conversion means is configure to perform Fourier transformation of the sample from time domain to frequency domain.

24. The radar device according to claim 21, wherein the mixed noise amount estimating means is configured to obtain a median value or an average value of the power in a predetermined high frequency range every sample, and estimate the median value or the average value as the amount of mixed noise.

25. The radar device according to claim 21, wherein the mixed noise amount estimating means calculates an average value of the power in all time domains of each sample, and estimate the calculated average value as the noise mixed value.

26. The radar device according to claim 21, wherein the mixed noise amount estimating means calculates a time length of the sample when the power of each sample is not less than the predetermined threshold value, and sets the estimated time length to the amount of mixed noise.

27. The radar device according to claim 21, wherein the coefficient determining means is configured to determine the weighting coefficient $w[i]$ (where, $w[i]$ is a weighting coefficient $w[i]$ as a ratio $(1/q[i])/\{(1/q[1])+\ldots+(1/q[N])\}$ of an inverse value $(1/q[i])$ of the amount $q[i]$ of mixed noise and a total sum $\{(1/q[1])+\ldots+(1/q[N])\}$ of inverse values $(1/q[i])$ of the amount of mixed noise corresponding to each of the first frequency range data $F[1]$ to the N-th frequency range data $F[N]$, where the weighting coefficient $w[i]$ is a weighting coefficient to be applied to the i-th frequency range data $F[i]$ ($i=1,\ldots N$)) from the first frequency range data $F[1]$ to the N-th frequency range data $F[N]$ as the predetermined number of the frequency range data in the target of the average calculation by the average means, and the amount $q[i]$ of mixed noise is estimated by the mixed noise amount estimating means, and to be applied to the sample as the data before the conversion to the frequency range data $F[i]$ to which the weighting coefficient $w[i]$ is applied.

28. The radar device according to claim 21, wherein the coefficient determining means is configured to:

compare the amount of noise mixed to the sample estimated by the mixed noise amount estimating means with a predetermined threshold value every each of the predetermined number of the frequency range data to be used for the average calculation by the averaging means, where the sample is data before the conversion to the frequency range data;

set, to a predetermined first value, the weighting coefficient to be applied to the frequency range data, the amount of mixed noise of which is less than the predetermined threshold value, and set, to a predetermined second value, the weighting coefficient to be applied to the frequency range data, the amount of mixed noise of which is not less than the predetermined threshold value, wherein the predetermined second value is smaller than the predetermined first value.

* * * * *